(12) United States Patent
Lee et al.

(10) Patent No.: US 8,909,786 B2
(45) Date of Patent: Dec. 9, 2014

(54) METHOD AND SYSTEM FOR CROSS-STRATUM OPTIMIZATION IN APPLICATION-TRANSPORT NETWORKS

(75) Inventors: Young Lee, Plano, TX (US); Yangsong Xia, Richardson, TX (US); Susan Hares, Saline, MI (US)

(73) Assignee: Futurewei Technologies, Inc., Plano, TX (US)

( * ) Notice: Subject to any disclaimer, the term of this patent is extended or adjusted under 35 U.S.C. 154(b) by 482 days.

(21) Appl. No.: 13/216,805

(22) Filed: Aug. 24, 2011

(65) Prior Publication Data

US 2012/0054346 A1 Mar. 1, 2012

Related U.S. Application Data

(60) Provisional application No. 61/377,361, filed on Aug. 26, 2010, provisional application No. 61/377,352, filed on Aug. 26, 2010.

(51) Int. Cl.
| | |
|---|---|
| *G06F 15/16* | (2006.01) |
| *H04L 12/24* | (2006.01) |
| *H04L 12/26* | (2006.01) |
| *H04L 12/715* | (2013.01) |
| *H04L 29/08* | (2006.01) |

(52) U.S. Cl.
CPC ............ *H04L 41/04* (2013.01); *H04L 41/0803* (2013.01); *H04L 43/00* (2013.01); *H04L 45/64* (2013.01); *H04L 67/1029* (2013.01); *H04L 69/32* (2013.01)
USPC .......................................... 709/226; 709/203

(58) Field of Classification Search
CPC .............. H04L 69/329; H04L 67/1021; H04L 67/1002; H04L 67/1008; H04L 45/02
USPC .................................................. 709/226, 203
See application file for complete search history.

(56) References Cited

U.S. PATENT DOCUMENTS

| | | |
|---|---|---|
| 7,006,472 B1 | 2/2006 | Immonen et al. |
| 2001/0053145 A1 | 12/2001 | Willars et al. |

(Continued)

FOREIGN PATENT DOCUMENTS

| | | |
|---|---|---|
| CN | 1443431 A | 9/2009 |
| CN | 101651658 A | 2/2010 |

(Continued)

OTHER PUBLICATIONS

Hares, S., et al., "Administrative Domains and Routing Domains A Model for Routing in the Internet," RFC 1136, Dec. 1999, 11 pages.

(Continued)

*Primary Examiner* — David Lazaro
(74) *Attorney, Agent, or Firm* — Conley Rose, P.C.; Grant Rodolph; Brandt D. Howell

(57) ABSTRACT

An apparatus comprising an application cross-stratum optimization (CSO) gateway (ACG) configured to communicate with a plurality of servers at an application layer, and a network CSO gateway (NCG) coupled to the ACG via an application-network interface (ANI) and configured to communicate with a plurality of network nodes at a plurality of network layers below the application layer, wherein the ANI allows joint application-network resource allocation, provisioning, and optimization. Also disclosed is a network apparatus implemented method comprising receiving at a service controller in a service plane a resource reservation request from an application controller coupled to an application plane to enable an application for a user, computing a path for the application, allocating the resource for the path at a network plane using network maintained databases, and forwarding a response with the allocated resource to the application plane via the service controller and the application controller.

11 Claims, 19 Drawing Sheets

(56) References Cited

U.S. PATENT DOCUMENTS

| | | |
|---|---|---|
| 2004/0022191 A1 | 2/2004 | Bernet et al. |
| 2007/0249321 A1 | 10/2007 | Kumar et al. |
| 2007/0250592 A1 | 10/2007 | Reckamp et al. |
| 2007/0266134 A1 | 11/2007 | Shyy et al. |
| 2008/0270534 A1 | 10/2008 | Xia et al. |
| 2008/0301765 A1 | 12/2008 | Nicol et al. |
| 2009/0046631 A1 | 2/2009 | Meylan et al. |
| 2009/0109893 A1 | 4/2009 | Gopal |
| 2009/0147684 A1 | 6/2009 | Majidi-Ahy |
| 2009/0168787 A1 | 7/2009 | Ansari et al. |
| 2009/0328048 A1 | 12/2009 | Khan et al. |
| 2010/0150161 A1 | 6/2010 | Saksena et al. |
| 2011/0185052 A1 | 7/2011 | Nakahira |
| 2012/0026869 A1 | 2/2012 | Wang et al. |
| 2012/0136926 A1 | 5/2012 | Dillon |
| 2012/0207116 A1 | 8/2012 | Chen et al. |
| 2013/0003613 A1 | 1/2013 | Raleigh |

FOREIGN PATENT DOCUMENTS

| | | | |
|---|---|---|---|
| EP | 2079197 A1 | | 7/2009 |
| JP | 2011155600 A | | 8/2011 |
| WO | 0211459 A1 | | 2/2002 |
| WO | WO 02/11459 A1 | * | 2/2002 |

OTHER PUBLICATIONS

Hinden, R., et al., "IPv6 Testing Address Allocation," RFC 2471, Dec. 1998, 6 pages.

Herzog, S., et al., "RSVP Extensions for Policy Control," RFC 2750, Jan. 2000, 14 pages.

Yavatkar, R., et al., "A Framework for Policy-Based Admission Control," RFC 2753, Jan. 2000, 21 pages.

Moore, B., et al., "Policy Core Information Model—Version 1 Specification," RFC 3060, Feb. 2001, 101 pages.

Chan, K., et al., "COPS Usage for Policy Provisioning (COPS-PR)," RFC 3084, Mar. 2001, 35 pages.

Berger, L., "Generalized Multi-Protocol Label Switching (GMPLS) Signaling Functional Description," RFC 3471, Jan. 2003, 31 pages.

Blunk, L., et al., "Routing Policy Specification Language Next Generation (RPSLng)," RFC 4012, Mar. 2005, 17 pages.

Walker, J., et al., "Common Open Policy Service (COPS) Over Transport Layer Security (TLs)," RFC 4261, Dec. 2005, 15 pages.

Farrel, A., et al., "A Path Computation Element (PCE)-Based Architecture," RFC 4655, Aug. 2006, 38 pages.

Schulzrinne, H., et al., "Common Policy: A Document Format for Expressing Privacy Preferences," RFC 4745, Feb. 2007, 33 pages.

Leroux, JL., et al., "OSPF Protocol Extensions for Path Computation Element (PCE) Discovery," RFC 5088, Jan. 2008, 19 pages.

Leroux, JL., et al., "IS-IS Protocol Extensions for Path COmputation Element (PCE) Discovery," RFC 5089, Jan. 2008, 16 pages.

Vasseur, JP., et al., "Path Computation Element (PCE) Communication Protocol (PCEP)," RFC 5440, Mar. 2009, 88 pages.

Vasseur, JP., et al., "A Backward-Recursive PCE-Based Computation (BRPC) Procedure to Compute Shortest Constrained Inter-Domain Traffic Engineering Label Switched Paths," RFC 5441, Apr. 2009, 19 pages.

D. Harrington, et al., "An Architecture for Describing SNMP Management Frameworks," RFC 2261, Jan. 1998.

B. Wijnen, et al., "View-based Access Control Model (VACM) for the Simple Network Management Protocol (SNMP)," RFC 2265, Jan. 1998.

"General principles and general reference model for Next Generation Networks," Y.2011, Oct. 2004.

Series Y: Global Information Infrastructure, Internet Protocol Aspects and Next Generation Networks, Next Generation Networks—Frameworks and Functional Architecture Models, "Functional Requirements and architecture of the Next Generation Networks," Y.2012, Apr. 2010.

L. Blunk, M. Karir, and C. Labovitz, "MRT routing information export format," draft-ietf-grow-mrt-13.txt, Sep. 9, 2010, 33 pages.

Oki, et al., "Framework for PCE-Based Inter-Layer MPLS and GMPLS Traffic Engineering," RFC 5623, Sep. 2009.

Shimoto, et al., "Requirements for GMPLS-Based Multi-Region and Multi-Layer Networks (MRN/MLN)," RFC 5212, Jul. 2008.

Lee, Y., "Cross Stratum Optimization (CSO): Networking the Clouds," Cloud Computing and Cross Stratum, Optimization Workshop, Daejeon, Korea, Jun. 7-8, 2011, 28 pages.

"Series Y: Global Information Infrastructure and Internet Protocol Aspects, Internet Protocol Aspects—Quality of Service and Network Performance, Network Performance Objectives for IP-Based Services," ITU-T, Telecommunication Standardization Sector of ITU, Y.1541, May 2002, 34 pages.

Lee, Y., et al., "Problem Statement for Network Stratum Query," draft-lee-network-stratum-query-problem-02.txt, Apr. 20, 2011, 15 pages.

Lee, Y., et al., "Problem Statement for Network Stratum Query," draft-lee-network-stratum-query-problem-01.txt, Oct. 20, 2010, 15 pages.

So, N., et al., "Problem Statement for Network Aware Application Resource Assignment and Mobility (NA-ARAM) in Data Center Environments," draft-so-network-aware-application-problem-02.txt, Apr. 20, 2011, 15 pages.

Foreign Communication From a Counterpart Application, PCT Application No. PCT/CN2011/079001, Written Opinion dated Dec. 1, 2011, 4 pages.

Foreign Communication From a Counterpart Application, PCT Application No. PCT/CN2011/079006, Written Opinion dated Dec. 1, 2011, 5 pages.

Foreign Communication From a Counterpart Application, European Application No. 11819436.4, Extended European Search Report dated Jul. 4, 2013, 8 pages.

Foreign Communication From a Counterpart Application, European Application No. 11819438.0, Extended European Search Report dated Jul. 4, 2013, 8 pages.

Office Action dated May 7, 2013, 25 pages, U.S. Appl. No. 13/216,808, filed Aug. 24, 2011.

Foreign Communication From a Related Counterpart Application, International Application No. PCT/CN2011/079001, International Search Report dated Dec. 1, 2011, 4 pages.

Foreign Communication From a Related Counterpart Application, International Application No. PCT/CN2011/079006, International Search Report dated Dec. 1, 2011, 3 pages.

Lee, Y., et al., "Problem Statement for Cross-Layer Optimization," Network Working Group, Internet Draft, draft-lee-cross-layer-optimization-problem-00.txt, Jul. 4, 2010, 14 pages.

Lee, Y., et al., Problem Statement for Cross-Layer Optimization, Network Working Group, Internet Draft, draft-lee-cross-layer-optimization-problem-01.txt, Jul. 12, 2010, 19 pages.

Lee, Y., et al., "Problem Statement for Network Stratum Query," Network Working Group, Internet Draft, draft-lee-network-stratum-query-problem-01.txt, Oct. 20, 2010, 15 pages.

Bradner, S., et al., "Key Words for Use in RFCs to Indicate Requirement Levels," RFC 2119, Mar. 1997, 4 pages.

Lee, Y., et al., "Research Proposal for Cross Stratum Optimization (CSO) between Data Centers and Networks," draft-lee-cross-stratum-optimization-datacenter-00.txt, Mar. 3, 2011, 16 pages.

Christodoulopoulos, K., et al., "Cross Layer Optimization of Static Lightpath Demands in Transparent WDM Optical Networks," Department of Computer Engineering and Informatics, Jun. 10-12, 2009, 5 pages.

Meng, et al., "Improving the Scalability of Data Center Networks with Traffic-Aware Virtual Machine Placement," IEEE INFOCOM 2010 Proceedings, May 2010, 9 pages.

* cited by examiner

METHOD AND SYSTEM FOR CROSS-STRATUM OPTIMIZATION IN APPLICATION-TRANSPORT NETWORKS

CROSS-REFERENCE TO RELATED APPLICATIONS

The present application claims priority to U.S. Provisional Patent Application Ser. No. 61/377,361, filed Aug. 26, 2010 by Young Lee et al., and entitled "Method and System for Cross-Stratum Optimization," and U.S. Provisional Patent Application Ser. No. 61/377,352, filed Aug. 26, 2010 by Young Lee et al., and entitled "Cross-Stratum Optimization Protocol," both of which are incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Network carriers, also referred to sometimes as telecommunications operators or communications service providers, that run existing networks desire to optimize the network utilization for passing traffic, such as Internet Protocol (IP) traffic, over a the physical network, e.g., across the network layers 1 to 5. The optimized traffic may include traffic for triple play services (e.g., Video, Voice, and/or Data) and any type of bulk data. In existing networks, end-to-end services are typically set-up by Operational Support Systems (OSS) systems or provider specific network management service applications. Network carriers have suggested two different scenarios for optimizing network utilization and traffic: optimizing existing network services and enabling new/emerging network application services.

SUMMARY

In one embodiment, the disclosure includes an apparatus comprising an application cross-stratum optimization (CSO) gateway (ACG) configured to communicate with a plurality of servers at an application layer, and a network CSO gateway (NCG) coupled to the ACG via an application-network interface (ANI) and configured to communicate with a plurality of network nodes at a plurality of network layers below the application layer, wherein the ANI allows joint application-network resource allocation, provisioning, and optimization.

In another embodiment, the disclosure includes a network component comprising a receiver configured to receive a network query from an application plane and a network response from a network plane, a service plane controller configured to enable for CSO between the application plane and the network plane by processing the network query for signaling the network plane and processing the network response for signaling the application plane, and a transmitter configured to send the processed network query to the network plane and the network response to the application plane.

In yet another embodiment, the disclosure includes a network apparatus implemented method comprising receiving at a service controller in a service plane a resource reservation request from an application controller coupled to an application plane to enable an application for a user, computing a path for the application, allocating the resource for the path at a network plane using network maintained databases, and forwarding a response with the allocated resource to the application plane via the service controller and the application controller.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
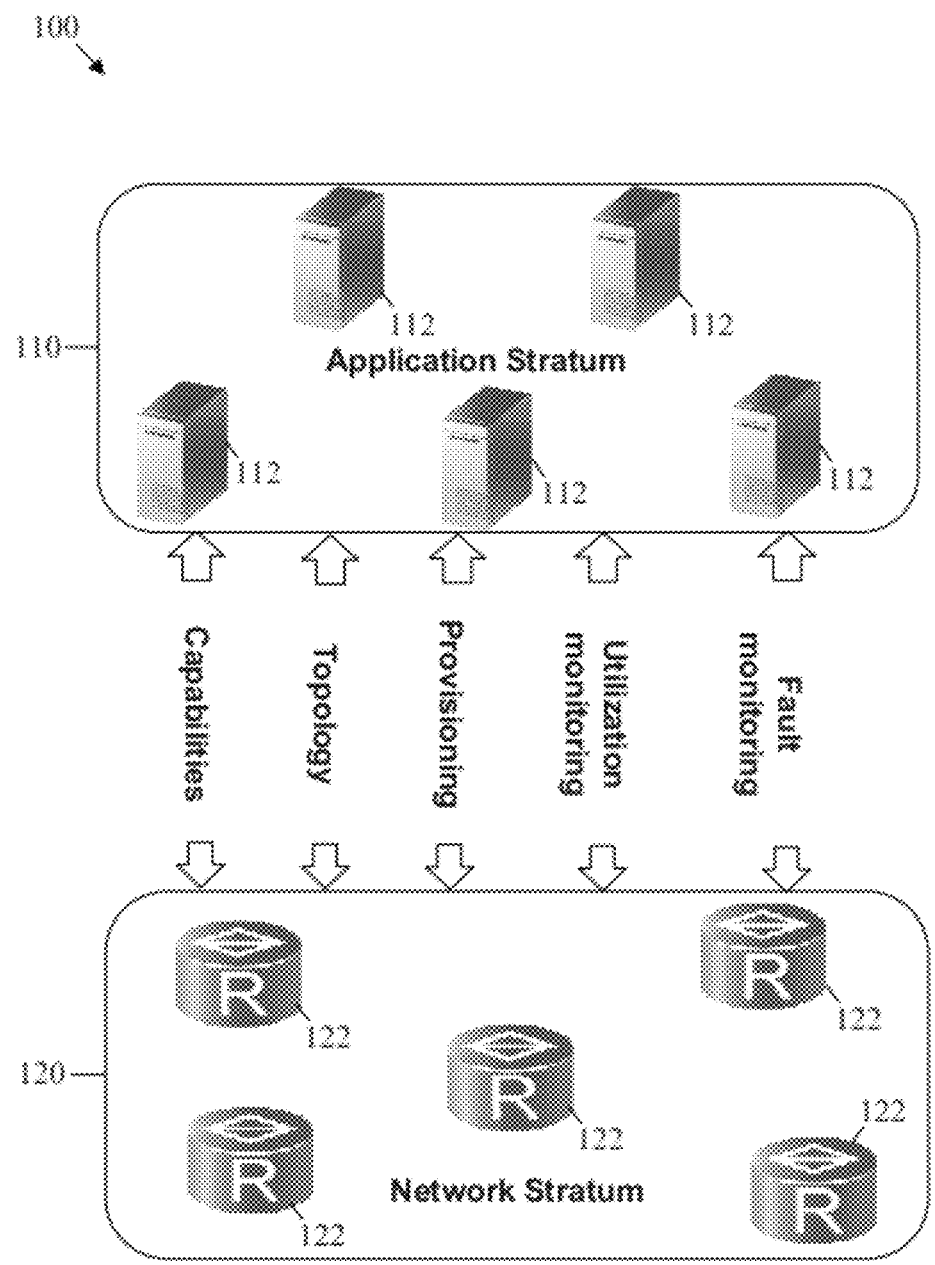
FIG. 1 is a schematic diagram of an embodiment of a CSO architecture.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The provisioning and operation of new/emerging applications may involve resolving the server selection (SS) problem in the application stratum as well as the network provisioning in the underlying network stratum. The application stratum may include the applications and services implemented or running over the network layer, and the network stratum may include the transport, network, link, and physical layers or combinations thereof. Handling and coordinating service provisioning across both the application stratum and the network stratum is different from handling traditional services, such as network provisioning of end-to-end telecommunications services. Disclosed herein is a system and methods for providing an architecture framework for CSO between the application stratum and the network stratum. The CSO may involve the integrated optimization of the application and network resources by providing an interface for interactions and exchanges between the two strata. The CSO may also include coordinating both application and network resources. An interface between the application stratum and the network stratum may be established to exchange monitoring information and configuration. The CSO may be achieved independent of any possible optimization for existing applications or services that run on a network.

The CSO may enable new services, e.g., using multi-domain and/or multi-device optimization. The new services may include file distribution systems, streaming video services, video conferencing services, and grid computing. These services may use both mobile devices and fixed devices. File distribution systems and services began by accelerating the download of web pages, such as those with images, and then expanded to include software, audio, and video file delivery. The steaming services may be separated in two types, live and on-demand services. Multiple variants between these two types may also be created when pause or replay functionality is included in a live streaming service. The live streaming may be the case where the client is willing to receive the stream at its current play out point rather than at some pre-existing start point. On-demand services may provide additional technical challenges. Service providers may wish to avoid long start up service delays to retain customers, while at the same time batch together requests to save on server costs. Video conferencing moves from the point-to-multipoint scenario of streaming content distribution to a multipoint-to-multipoint situation. Further, there may be an additional hard Quality of Service (QoS) constraint on latency. Grid computing may have requirements for substantially large file transfer with reduced fan and larger file sizes.

One problem in interactions between the application stratum and the network stratum is the lack of an open standard interface that allows a proxy signaling between application and network strata. This may limit cross-stratum information sharing, feedback mechanism between strata, and integrated/synchronized resource allocation and re-configuration. This lack of coordination between the application and network strata may increase the potential for resource wastage, which may translate to a higher cost for both application and network operations.

Some of the terms used and described below with respect to CSO features include: application profile, application resources, application overlay, application service, ACG, network resources, and a NCG. The application profile may comprise the characteristics and requirements that the application service may place on the network. The application resources may comprise non-network resources that may be critical to achieving the application service functionality. For example, the application resources may include caches, mirrors, application specific servers, content, large data sets, and/or other resource related applications. The application overlay may comprise a set of application resources that may be geographically spread and constitute an overlay with respect to network underlay. The application service may be any networked application offered to a variety of clients. The ACG may be a CSO entity in the application stratum that is responsible for gathering application resources load and utilization, making resource allocation decisions, and interacting with the NCG. The network resources may comprise resources of any layer 3 or lower layer, such as bandwidth, links, paths, path processing (e.g., creation, deletion, and management), network databases, path computation, and the routing and signaling protocols for creating paths.

FIG. 1 illustrates embodiments of a CSO architecture 100. The CSO architecture 100 may comprise an application stratum 110 and a network stratum 120. The application stratum 110 may comprise a plurality of servers 112, which may be configured to implement or run applications for end-users or customers (not shown). The network stratum 120 may comprise a plurality of network nodes 122, such as bridges, routers, and/or switches, for forwarding data, e.g., packets, associated with the applications. The servers 112 may be located in a data center and the network nodes 122 may be located in a network coupled to the data center. The servers 112 may communicate with the network nodes 122 to enable servicing the user applications and forwarding or transporting the associated data. The CSO may be implemented to optimize the different operations of the servers 112 and the network nodes 122.

In an embodiment, the data centers used to provide application services, such as cloud computing and other cloud services, at the application stratum 110 to the end-users may be distributed geographically around the network stratum 120. Thus, many decisions made in the control and management of application services, such as where to instantiate another service instance or to which data center a new client is assigned, may have a significant impact on the state of the network. The capabilities and state of the network may also have an impact on application performance.

Currently application decisions may be made with little or no information concerning the underlying network used to deliver those services. Hence, such decisions may be sub-optimal from both application and network resource utilization and from the achievement of QoS objectives. The CSO may provide a method and system to coordinate resource allocation between the application stratum 110 and the network stratum 120, e.g., in the context of cloud computing and data center networks. For instance, the CSO objectives may support network stratum 110 query from application, joint provisioning between application and network, and/or joint re-allocation of resources upon anomaly in both application and network. The CSO objectives may also provide application-aware network and network-aware application and global load balancing capability.

Some of the objectives for optimizing the operations and/or interactions between the application stratum 110 and the network stratum 120, e.g., between the servers 112 and the network nodes 122, may include improving network capabilities, topology, provisioning, utilization monitoring, fault monitoring, or combinations thereof. For instance, the CSO objectives 100 may improve the exchange of either or both network capabilities or application demand/resource information, topology and/or traffic-engineering related information between the layers (virtualization/abstraction), or both. The CSO objectives may also improve initiating service instantiation of application to network with profile exchange (provisioning), exchanging application/network congestion/failure information (monitoring), or both.

Figure 2:
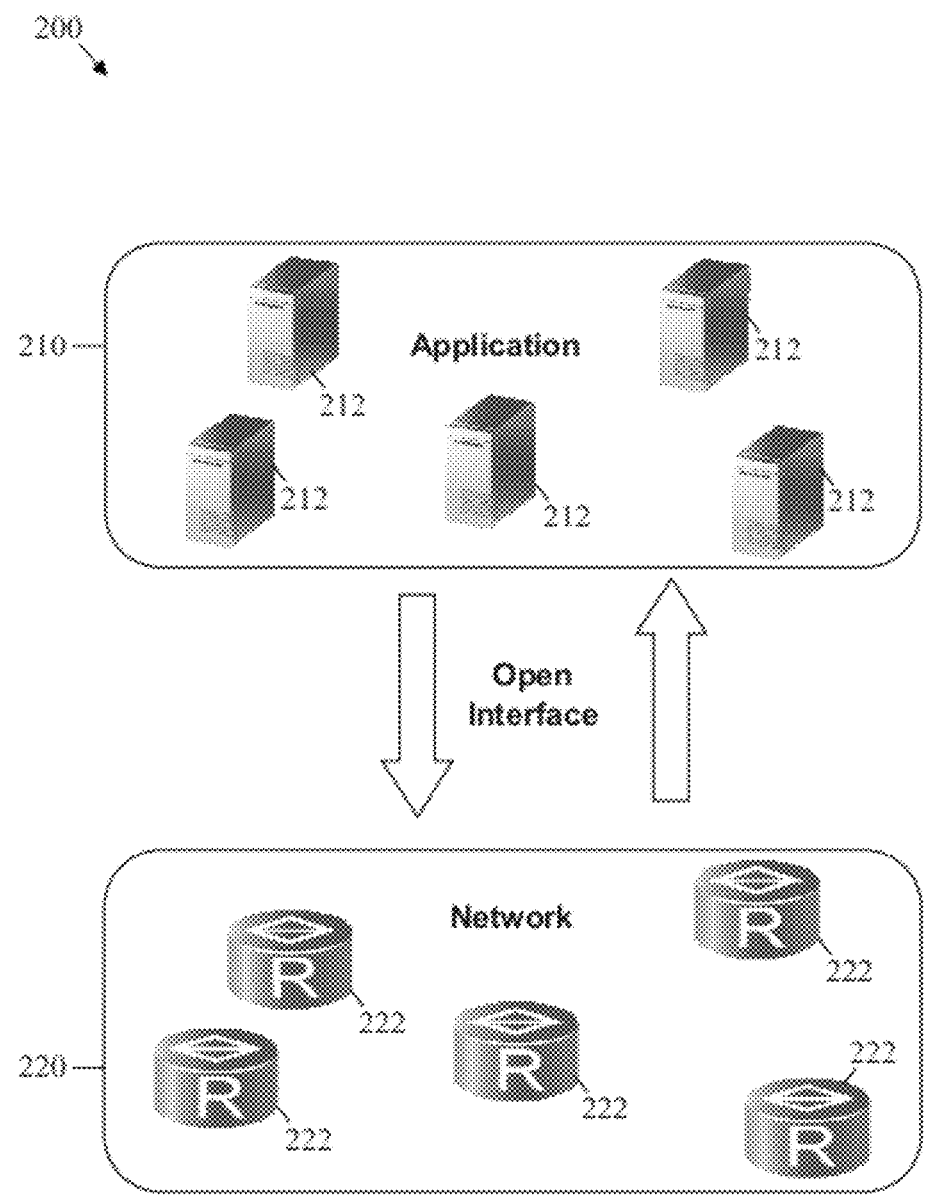
FIG. 2 is a schematic diagram of another embodiment of a CSO architecture.

FIG. 2 illustrates another embodiment of a CSO architecture 200 that may comprise an application stratum 210 and a network stratum 220. The application stratum 210 may comprise a plurality of servers 212 and the network stratum 220 may comprise a plurality of network nodes 222, which may be substantially similar to the servers 112 and the network nodes 122, respectively. The CSO architecture 200 may also comprise a CSO interface that allows better interactions and/or communications between the servers 112 and/or other components (not shown) of the application stratum 210 and the network nodes 122 and/or other components (not shown) of the network stratum 220. The CSO interface may be an open interface between the two strata and may enable some of the CSO features described below. At the application stratum 210, the open interface may allow client/customer identification of some type, e.g., Internet Protocol (IP) address, server types and identification, application data flows and QoS requirements that may be statistical in nature and vary over time, and/or server load and fault conditions. At the network stratum 220, the open interface may allow exchanging network topology, client and server locations within that topology, network capabilities and capacities with respect to QoS, bandwidth, latency information, and/or other network related features, network load and fault conditions, or combinations thereof.

Figure 3:
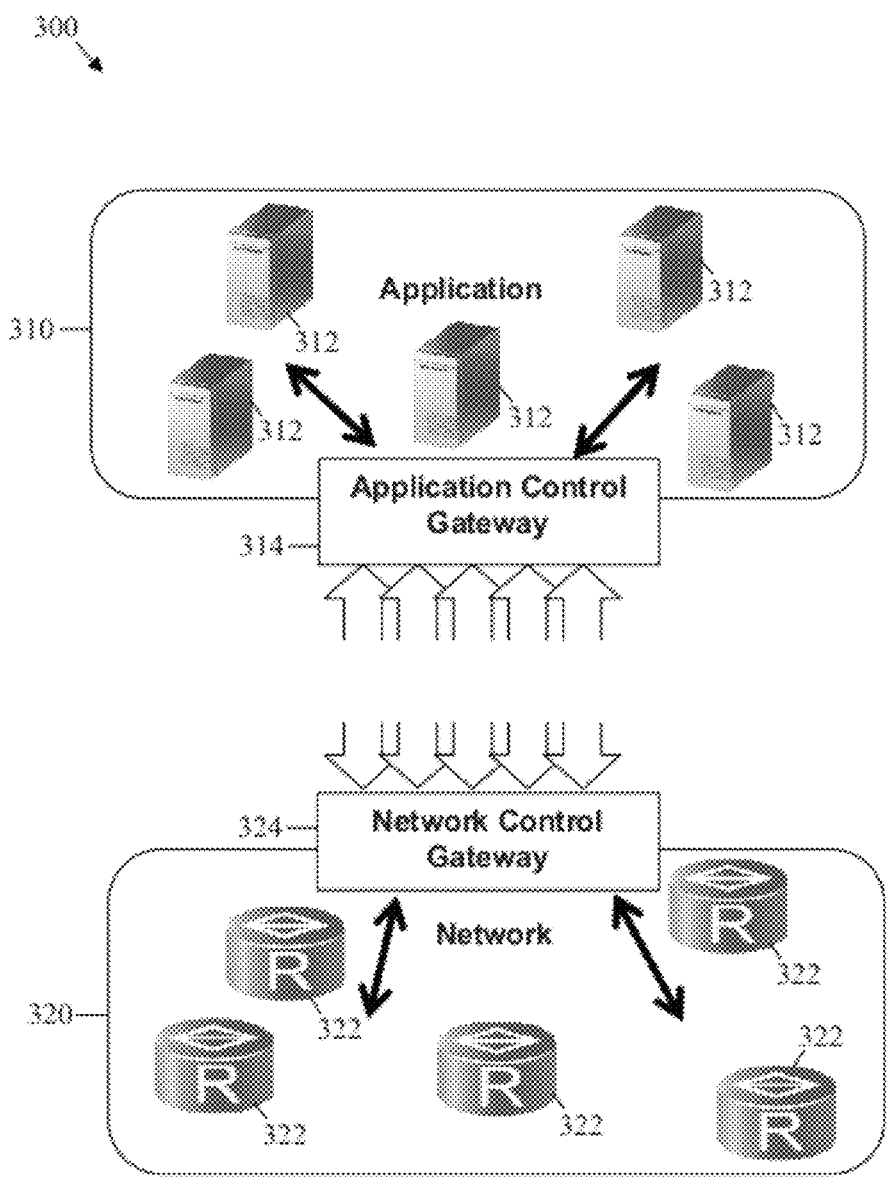
FIG. 3 is a schematic diagram of another embodiment of a CSO architecture.

FIG. 3 illustrates another embodiment of a CSO architecture 300 that may comprise an application stratum 310 and a network stratum 320. The application stratum 310 may comprise a plurality of servers 312 and the network stratum 320 may comprise a plurality of network nodes 322, which may be substantially similar to the servers 112 and the network nodes 122, respectively. The CSO architecture 300 may also comprise a CSO interface that may be established between an ACG 314 at the application stratum 310 and a NCG 324 at the network stratum 320.

The ACG 314 may be configured to access application related data and processes (at the application stratum 310), communicate with the NCG 324 (via the CSO interface), and provide information abstraction/virtualization and access limitations to external entities (outside the application stratum 310) including the network stratum 320 entities. The NCG 324 may be configured to access network related data (at the network stratum 320), communicate with the ACG 314 (via the CSO interface), communicate with network processes such as admission control, resource reservation, and/or connection processing, and provide information abstraction/virtualization and access limitations to outside entities (outside the network stratum 320) including the application stratum 310 entities. Additionally, the ACG 314 and the NCG 324 may communicate with the servers 312 and the network nodes 322, respectively.

Figure 4:
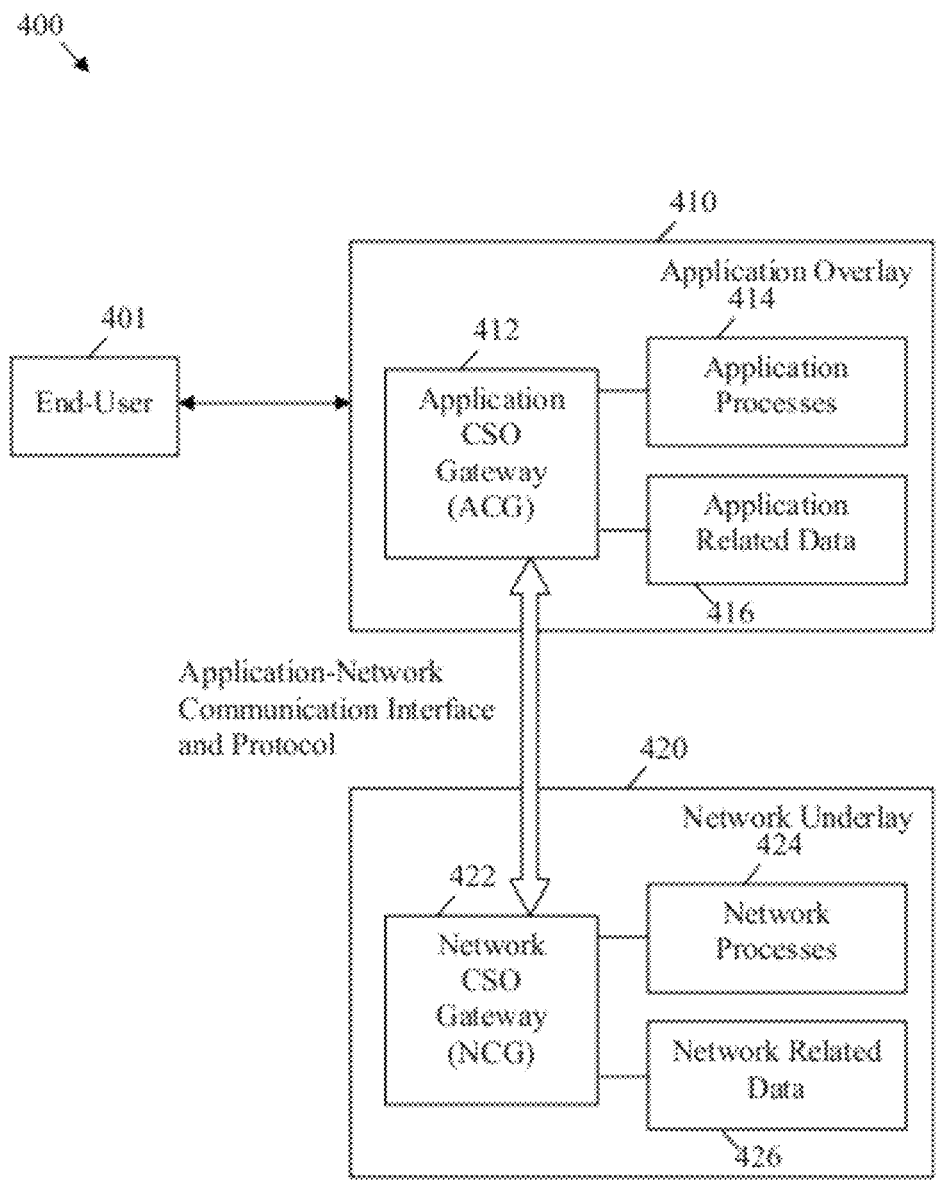
FIG. 4 is a schematic diagram of another embodiment of a CSO architecture.

FIG. 4 illustrates another embodiment of a CSO architecture 400 that may comprise an application stratum 410 and a network stratum 420. The application stratum 410 and the network stratum 420 may also be referred to herein as application overlay and network underlay, respectively. Additionally, the CSO architecture may include one or more end-users 401 that may communicate with the application stratum 410. The application stratum or overlay 410 may comprise an ACG 412 that may communicate with application processes 414 and application related data 416. The network or underlay 420 may comprise a NCG 422 that may communicate with network processes 424 and network related data 426. The ACG 412 and the NCG 422 may also communicate with each other via an ANI and protocol.

The application overlay 410 may be a network comprising a plurality of servers/application resources that provide application services, such as content delivery or video-on-demand (VOD) services, to the end-users 401. Relative to the application overlay 410, the network underlay 420 may be an underlying network that carries traffic in the data unit based on its transport technology. In the CSO architecture, each stratum may keep its own independence and autonomy. For instance, if the application overlay 410 needs to communicate with network underlay 420, each stratum may be kept independent from the other. There may be a trust relationship established between the two strata prior to communications and that trust relationship may be verified via an authorization/authentication mechanism.

The ANI between the application stratum 410 and the network stratum 420 may be configured to allow joint application-network resource allocation and re-allocation/re-optimization and joint application-network resource provisioning. The ANI may also allow a network stratum query from an application layer or an application for its service provisioning and joint application-network event escalation from network to application layers or from application to network layers. Further, the ANI may enable an application-aware network layer and a network-aware application layer. These properties/features of the ANI are described in mode detail below.

The ACG 412 may serve as a proxy to the network underlay 420 and to application related processes including access to the end-user's 401 profile. Some of the functionalities of the ACG 412 may include:
communicating with the NCG 422 via a protocol that may allow requests for:
  network virtual topology/Traffic Engineering (TE) information;
  path estimation, and path reservation; and
  application resources (e.g., server) status and information.
accessing application related data such as:
  maximum number of simultaneous instances of the application usage;
  maximum storage assignable;
  physical or virtual assignment of processing;
  memory, storage access rate (disk, random access memory (RAM), etc.);
  availability of virtual machine instances (existing or created) in a different location; and
  whether an application must execute in multiple physical and failover requirement.
communicating with application processes; and
translating application/end-user service profile and creating a "standard" application service profile that may be understood by the NCG 422.

The NCG 422 may serve as a proxy to the application overlay 410 and to network related processes. Some of the functionalities of the NCG 422 may include:
communicating with the ACG 412 via a protocol that may allow replies to:
  the application's requests sent by the ACG 412, as described above;
accessing network related data (e.g., management information base (MIB)/YANG, link state database (LSDB), TE database (TED), etc.);
communicating with network processes such as:
  admission control, resource reservation;
  path computation, path provisioning/configuration (creating, deleting and maintenance); and
  network monitoring.

Emerging Internet network management may use the netconf function for configuring and monitoring data. Simple Network Management Protocol (SNMP) based MIBs are being replaced by YANG module MIBs. New work within the netconf emerging network management is intended to provide whole-network synchronous and synchronized configuration and monitoring. If these services are available, then the NCG may use these services to monitor and configure across the whole network entities upon configuration request from the ACG. The NCG may require the ability to have network wide configuration functions signaled to the netconf entity with the following information:

commit-config <transaction #><time>
    copy-config <transaction #><time>
    edit-config <transaction #><time>
    roll-back-to <transaction #><time>
    roll-forward-to <transaction #><time>
    lock-config <transaction #><time>
    unlock-config <transaction #><time>

The NCG may require that such functions and/or information be available on transaction based numbers. The NCG may also require the ability to have network wide monitoring with the following information:

begin-monitor <transaction-config #><time>
    cease-monitor <transaction #><time>
    modify-monitor <transaction #><time>
    roll-back-to <transaction #><time>
    roll-forward-to <transaction #><time>
    lock-monitor <transaction #><time>
    unlock-monitor <transaction #><time>

According to the NCG requirement to specify monitoring for full network's devices based on a transaction number, the transaction may specify a full network's profile of monitoring information. If pre-netconf Internet network management exists in a network, such as SNMP MIBs, Remote Network Monitoring (RMON), or Real-time Application QoS Monitoring (RAQMON) based on the Internet Engineering Task Force (IETF) Request for Comments (RFC) 3471, which is incorporated herein by reference, exists in a network, or if a mixture of Internet management exists, then the NCG device may create an adaptation layer to utilize the mixture of services.

Existing IP network management may also allow for admission control based on policy. This policy may be based on an architecture of "Policy Enforcement Points (PEP)" and "policy control points (PCP)" with a management tool, as described in RFC 3060, RFC 2753, both of which are incorporated herein by reference, and RFC 3471. The CSO may extend the existing architectural policy model. This general policy architecture has been adapted for:

differentiated services (Diff-Serv) within IP networks via Common Open Policy Services (COPS), as described in RFC 2471, and RFC 3084, RFC 4261, both of which are incorporated herein by reference, or Resource Reservation Protocol (RSVP), as described in RFC 2750, which is incorporated herein by reference;

wireless device policy (control and provisioning of wireless access points (CAPWAP));

security policies (geopriv as described in RFC 4745, which is incorporated herein by reference, group-security);

routing policy (Routing Policy Specification Language (RPSL) as described in RFC 4012, which is incorporated herein by reference);

policy-enabled path elements (PCEs);

mobile services (Protocol-Independent Multicast version 6 (PIMv6)); and application policy.

Additionally, the CSO architecture may comprise a PCE, which may be one of the building blocks or components of the CSO architecture. The PCE architecture is described in RFC 4655 and the PCE Protocol (PCEP) is described in RFC 5440, both of which are incorporated herein by reference. The PCE may provide path computation to a client referred to herein as a Path Computation Client (PCC). The NCG may act as a PCC to the PCE in the context of the CSO architecture.

Figure 5:
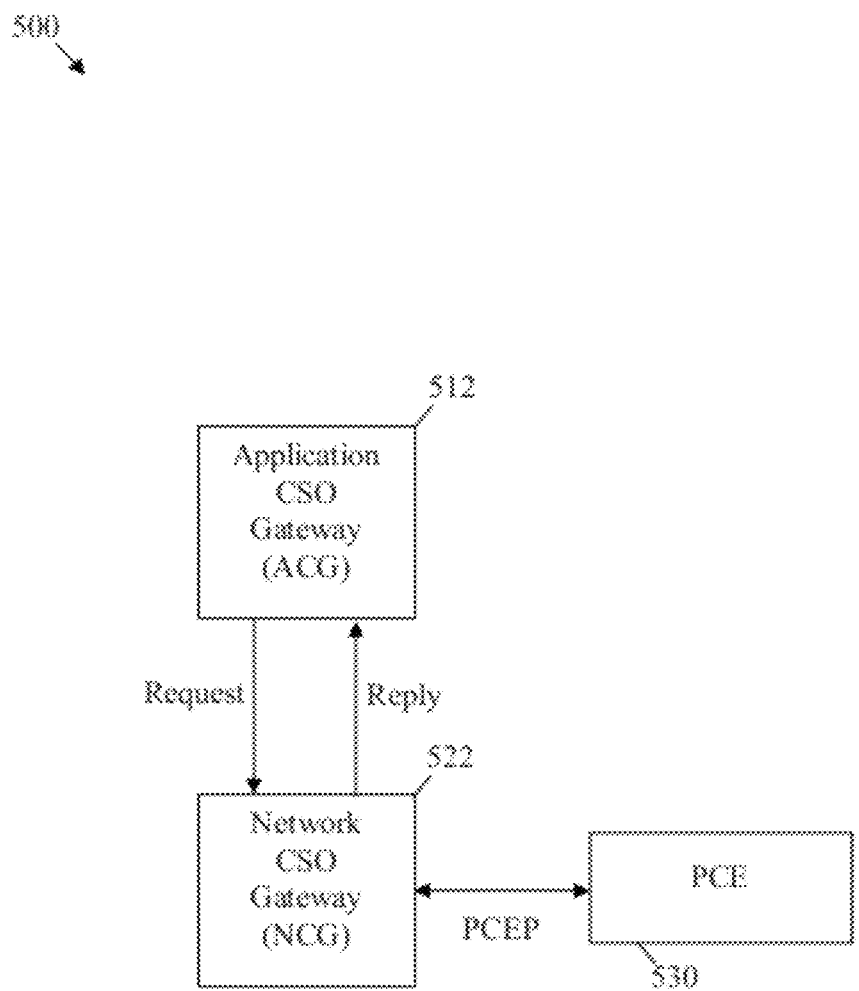
FIG. 5 is a schematic diagram of an embodiment of an interaction between a NCG and a path computation element.

FIG. 5 illustrates an embodiment of an interaction 500 between a NCG 522 and a PCE 530 in the context of path estimation for the CSO architecture. An ACG 512 may make a path estimation request to the NCG 522, which in turn may make a path computation request using PCEP, as described in RFC 5440. The RFCs 5088 and 5089, both of which are incorporated herein by reference, describe how to discover a proper PCE from the NCG's 522 perspective. The PCE 530 may provide candidate paths compliant with specific constraints that may be originally fed from the ACG 512, such as connectivity (e.g., point-to-point (P-P), point-to-multipoint (P-MP), etc.) and some QoS parameters (e.g., latency) as well as bandwidth requirement for the connectivity. The path computed by the PCE 530 may be an estimation of the path from the application based on the latest network link and node traffic data, which may be known as TED. Once the path has been found, then the NCG 522 may reply with the resulting path to the ACG 512. If the application requires bandwidth reservation of the computed path, then the NCG 522 may proceed further with the path provisioning process either via a network management configuration process or via control plane functionality.

Figure 6:
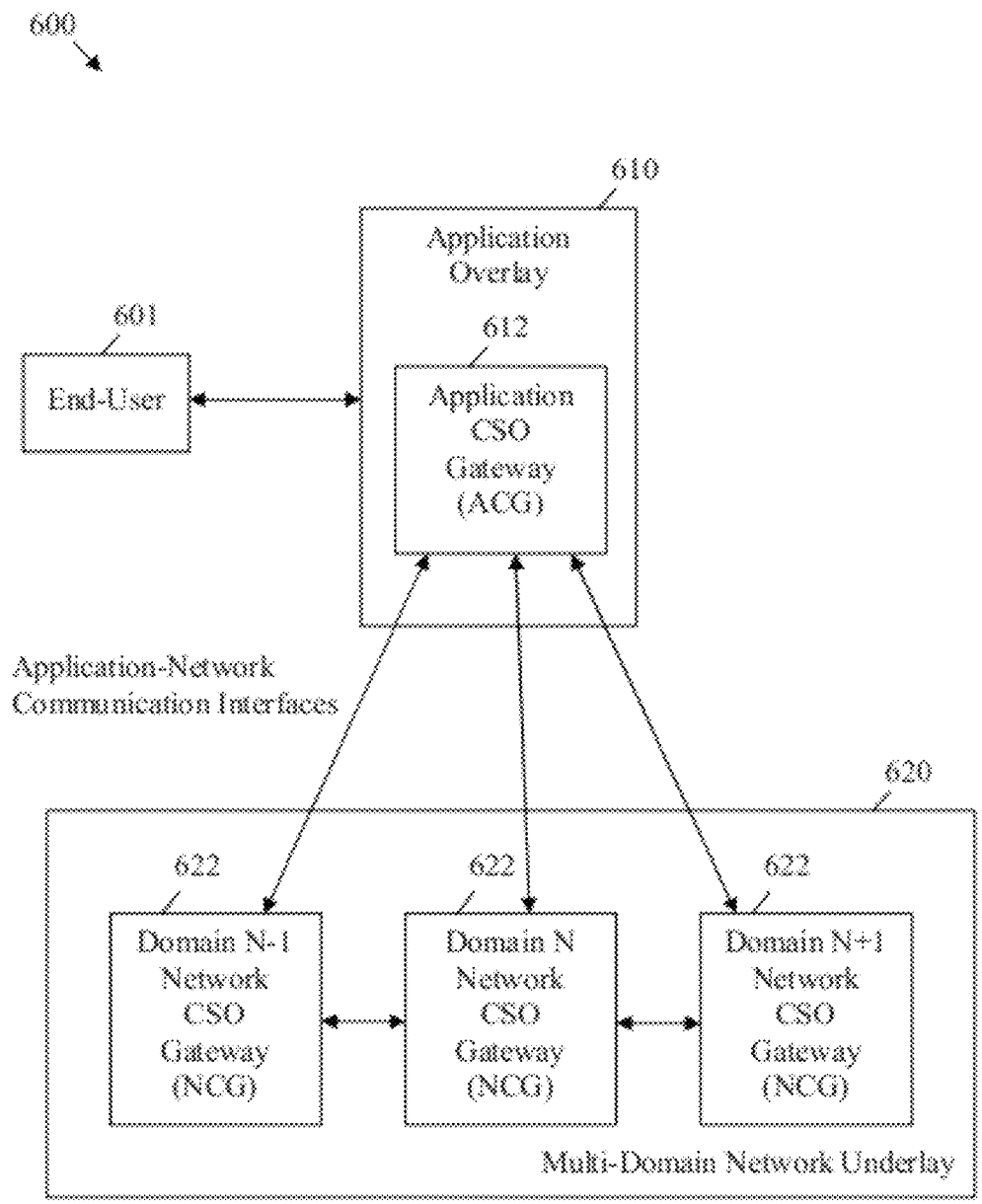
FIG. 6 is a schematic diagram of an embodiment of a CSO multi-domain architecture.

FIG. 6 illustrates an embodiment of a CSO multi-domain architecture 600. The CSO multi-domain architecture 600 may comprise access transport networks and a backbone transport network and may be extended from the CSO architectures above. The multi-domain architecture 600 may comprise one or more end-users 601, an application stratum or overlay 610, a multi-domain network stratum or underlay 620, which may be coupled and arranged as shown in FIG. 6. The application stratum or overlay 610 may comprise an ACG 612 that may communicate with a plurality of NCGs 622 that correspond to a plurality of domains at the multi-domain network underlay 620 via a plurality of corresponding application-network communication interfaces.

The CSO multi-domain architecture 600 may be used to support multi-domain underlay networks. The ACG 612 may function or act as the central proxy that interfaces with end-users 601 and application data and processes as well as with the NCG 622 in each domain N (N is an integer). Communication between domains may make reuse of existing multi-domain protocols developed in the IETF routing area and any new requirements may be fed into existing working groups. For instance, an application identifier may need to be kept across network domains (in the multi-domain network underlay 620) and well as in the application overlay 610.

Multi-technology is also implied and supported in the CSO multi-domain architecture 600. For example, Domain N−1 may have different network technology from Domain N. In such a case, appropriate translation and adaptation functions of the original application information and its related request may need to be provided in each domain to ensure application service profile to be seamlessly communicated across domains. For instance, Domain N−1 may be regarded as an access network where consuming resources reside and Domain N+1 as an access network where application resources (e.g., video distribution) reside, while Domain N may be regarded as the backbone/aggregation network that provides transport for application data. For example, the access network may be Layer 3 (L3) IP networks, while backbone network can be a Layer 1 (L1) optical network.

The Network management (e.g., SNMP netconf/YANG) for the network-stratum may abide by Routing Administrative Domain (AD) boundaries, as described in RFC 1136, which is incorporated herein by reference. As RFC 1136 indicates, the AD may comprise multiple Autonomous systems if these Autonomous systems are on the administrative control of one entity. For example, if a BIGNet provider controls Domain 1 which has 4 Autonomous systems, then one NCG may operate over these 4 Autonomous systems. The Policy management systems (e.g., PEP, PCP, etc.) may also abide by AD boundaries (RFC 1136). Then again, as mentioned above and as RFC 1136 indicates, the AD may comprise multiple Autonomous systems if these Autonomous systems are on the administrative control of one entity. For example, if a BIGNet provider which exists in Domain 1 and has 4 Autonomous systems, then the NCG may operate within the policy scope of the BIGnet's Domain 1.

Figure 7:
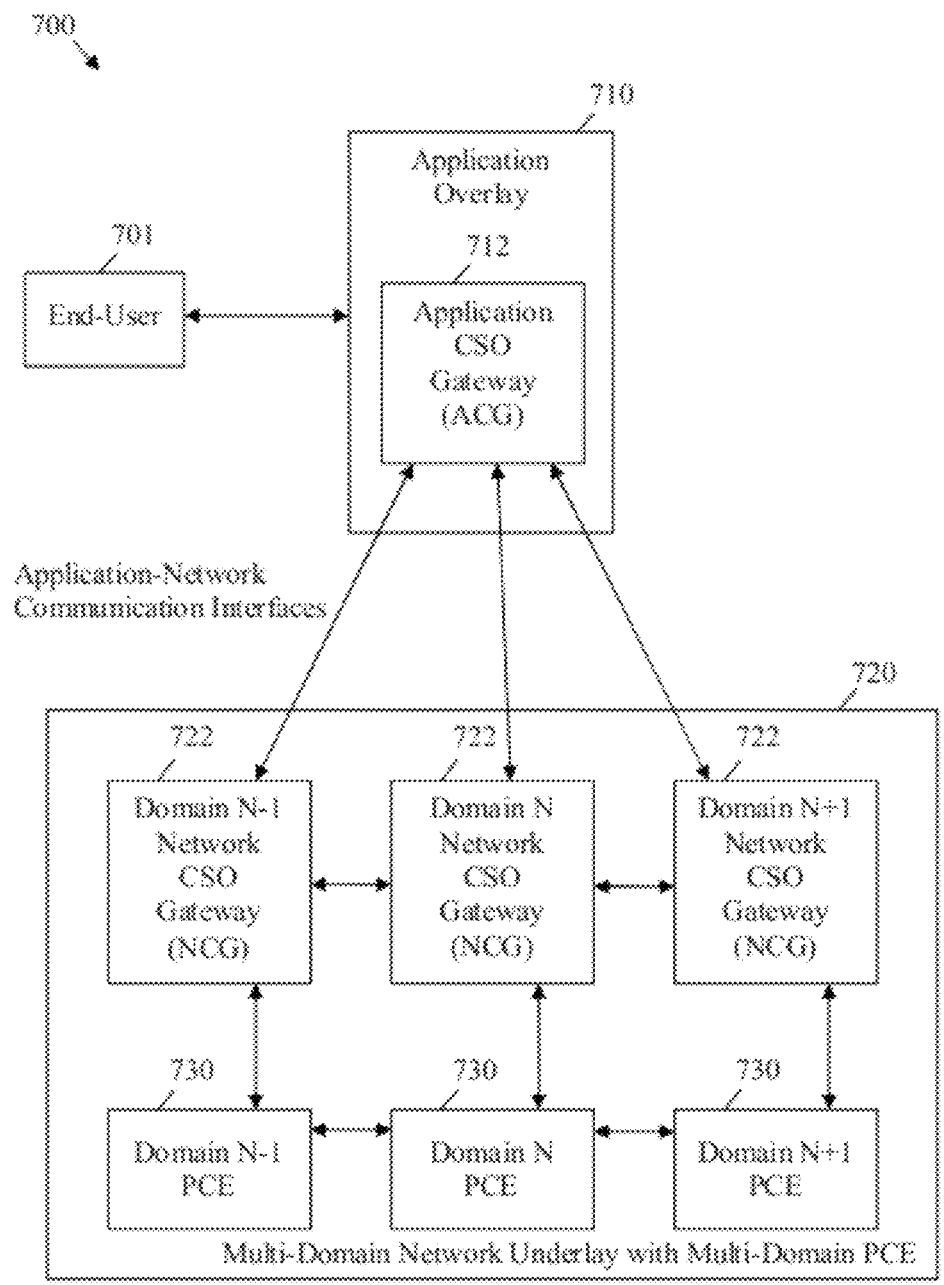
FIG. 7 is a schematic diagram of an embodiment of a CSO multi-domain interaction with multi-domain path computation element.

FIG. 7 illustrates an embodiment of a CSO multi-domain interaction 700 with multi-domain PCEs, where one or more end-users 701 may communicate with an application overlay 710 that interacts with a multi-domain network underlay 720. The application overlay 710 may comprise an ACG 712 that may communicate with a plurality of NCGs 722 corresponding to a plurality of domains at the multi-domain network underlay 720 via a plurality of corresponding application-network communication interfaces. The components of the application overlay 710 and the multi-domain network underlay 720 may be configured substantially similar to the corresponding components described above. Additionally, the multi-domain network underlay 720 may comprise a plurality of PCEs 730 that correspond to the domains at the multi-domain network underlay 720. Specifically, each PCE 730 may interact with the corresponding NCG 722, which may act as a PCC, in the corresponding domain, e.g., in a manner similar to the interaction 500.

As described above, each network Domain NCG 722 may be associated with that Domain's PCE 730. The consuming resource of the application (e.g., end-user) may traverse multiple domains to get to the source of the application (e.g., video server). For example, the source of the application may home on Network Domain N+1, while the consuming resource of the application may home on Network Domain N−1. Network Domain N may be a transit network that connects Network Domain N−1 and N+1. As such, a multi-domain path may be computed, e.g., by multiple PCEs 730. A domain sequence may be determined by the policy. RFC 5441, which is incorporated herein by reference, describes how an inter-domain TE-Label Switched Path (LSP) may be computed in a backward-recursive manner. The domain sequence may be known prior to path computation.

Figure 8:
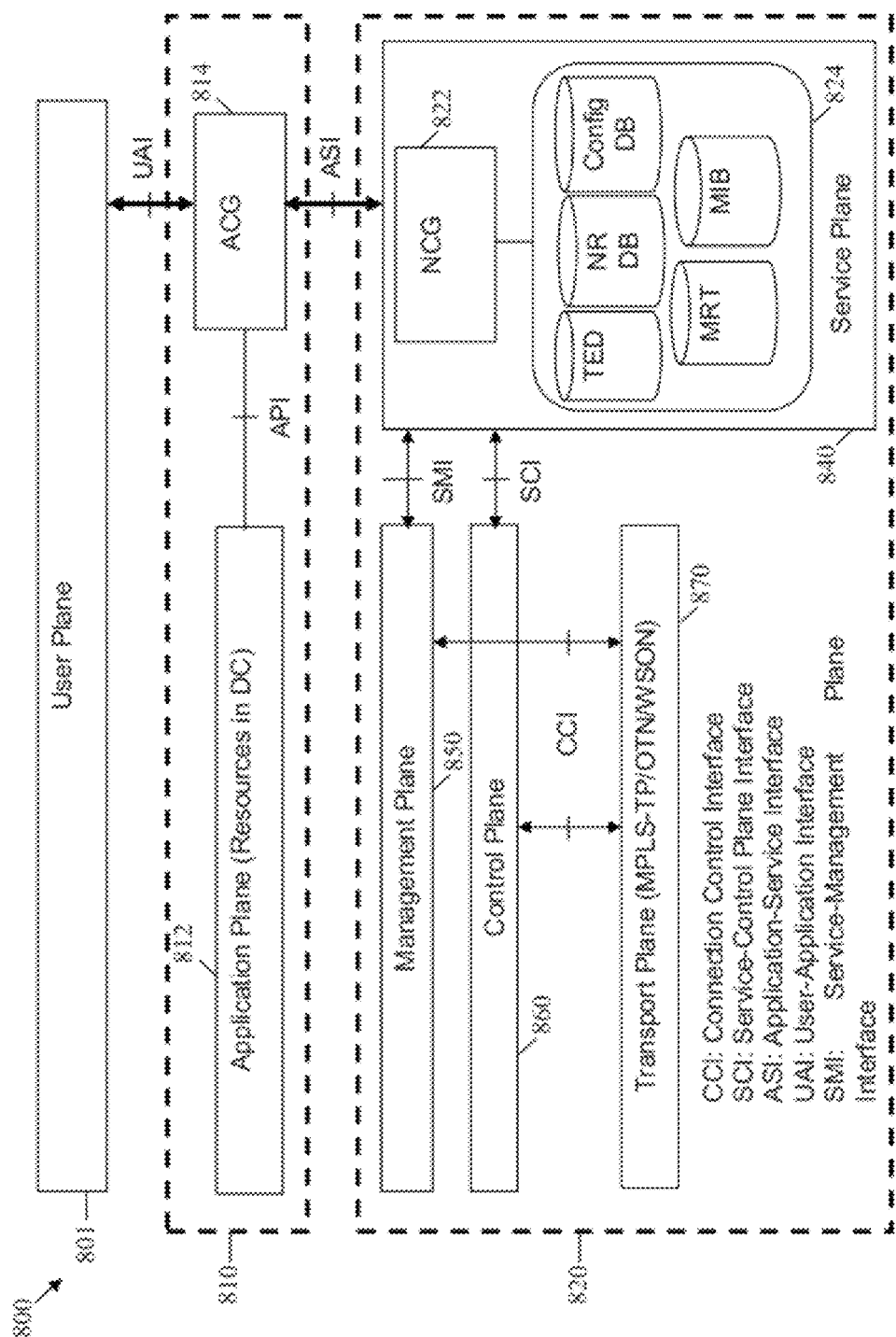
FIG. 8 is a schematic diagram of another embodiment of a CSO architecture.

FIG. 8 illustrates another embodiment of a CSO architecture 800, which may comprise a user plane 801, an application stratum 810, and a network stratum 820. The application stratum 810 may comprise an application plane 812 (e.g., in a data center (DC)), and an ACG 814, which may communicate with the application plane 812 via an application plane interface (API). The ACG 814 in the application stratum 810 may also communicate with the user plane 801 via a user-application interface (UAI). The network stratum 820 may comprise a service plane 840, a management plane 850, a control plane 860, and a transport plane 870. The transport plane 870 may support the transport technology of the corresponding network infrastructure, such as for Multiprotocol Label Switching-Transport Profile (MPLS-TP), Optical Transport Network (ONT), or Wavelength Switched Optical Network (WSON).

The service plane 840 may be configured to allow communications between the application plane 812 in the application stratum 810 and the management plane 850, control plane 860, and transport plane 870 in the network stratum 820, e.g., in an optimized manner based on CSO. The service plane 840 may communicate with the application plane 812 via an application-service interface (ASI), the management plane 850 via a service-management plane interface (SMI), and the control plane 860 via a service-control plane interface (SCI). The transport plane 870 may communicate with the management plane 850 and the control plane 860, and thus the service plane 840, via a connection control interface (CCI).

The service plane 840 may be provided by a party or entity (e.g., a provider) that may be independent of the user plane 801, the application stratum 810, and the network stratum 820. For instance, the application stratum 810 and the network stratum 820 may be managed by different entities or providers, and the service plane 840 may be managed by a third party. The service plane 840 may comprise a NCG 822, and a plurality of network service databases 824, which may comprise a TED, a Network Routing (NR) Database (DB), a Config DB, a Multiple Routing Tables (MRT), a MIB, and/or other networking databases. The network service databases 824 may comprise at least some information that may be copied from similar databases in the network planes. The NCG 822 may communicate with the ACG 814, and thus the application plane 812, via the ASI, the management plane 850 via the SMI, and the control plane 860 via the SCI. The NCG 822 may also access the information in the network service databases 824 as needed to allow the flow of traffic and communications between the different planes and strata.

Figure 9:
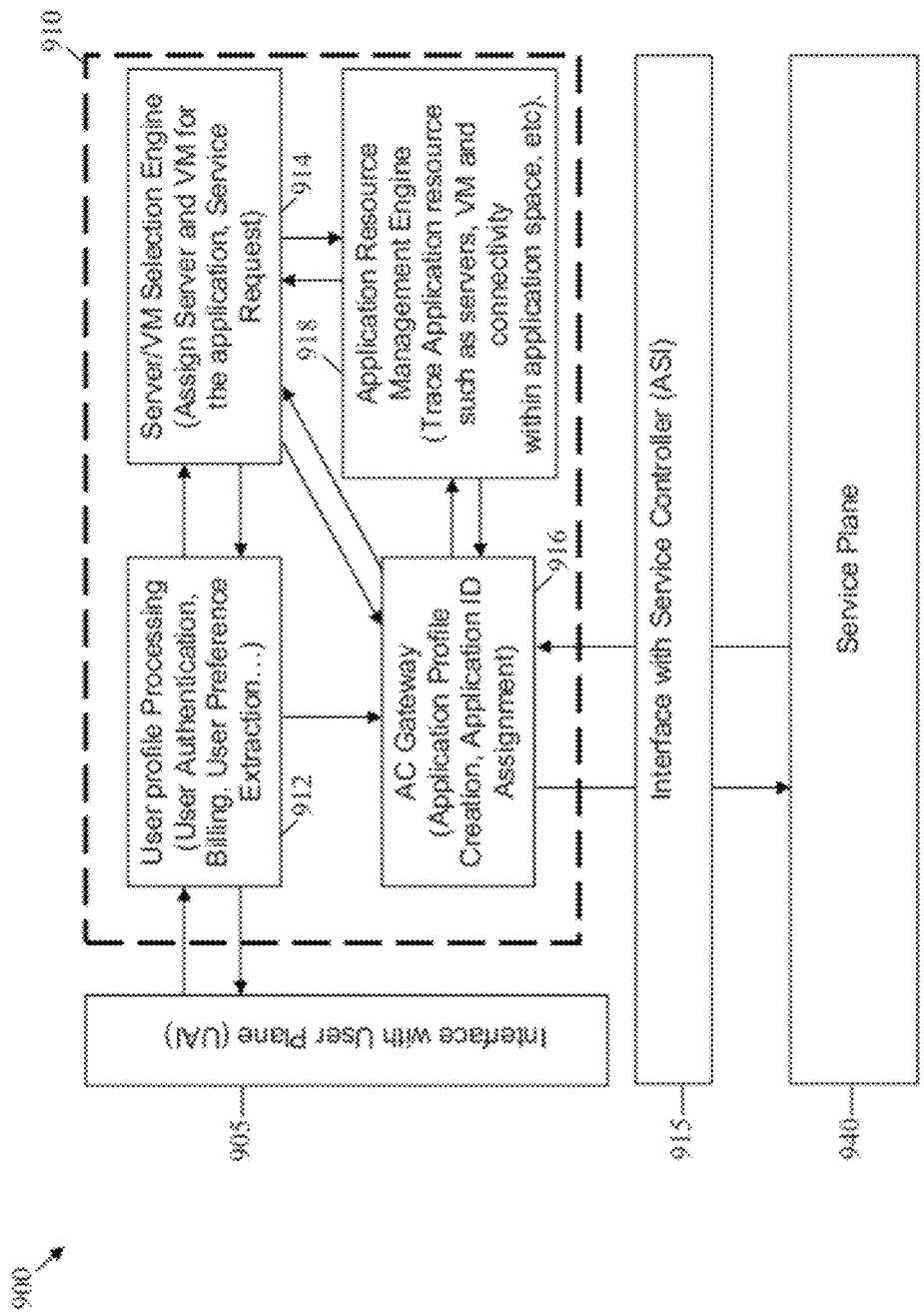
FIG. 9 is a schematic diagram of an embodiment of an application controller architecture.

FIG. 9 illustrates an embodiment of an application controller architecture 900. The application controller architecture 900 may comprise an application controller 910 (that may include the ACG), a UAI 905, an ASI 915, and a service plane 940. The application controller 910 may be located at an application stratum or overlay, e.g., in communication with an application plane. The application controller 910 may comprise a plurality of modules, engines, or entities, including a user profile processing engine 912, a service and/or virtual machine (VM) selection engine 914, an ACG 916, and an application resource management engine 918, which may all communicate with one another.

The user profile processing engine 912 may handle information regarding user authentication, billing, user preference extractions, and/or other end-user related information. The user profile processing engine 912 may also communicate with the end-user or user plane via the UAI. The server/VM selection engine 914 may assign one or more servers and/or VMs for the user's application and handle user service requests. The ACG 916 may communicate with the service plane 940 via the ASI. The application resource management engine 918 may trace application resources, such as server and VMs, and/or other connectivity with the application space or stratum. The other components of the application controller architecture 900 may be configured similar to the corresponding components described above.

Figure 10:
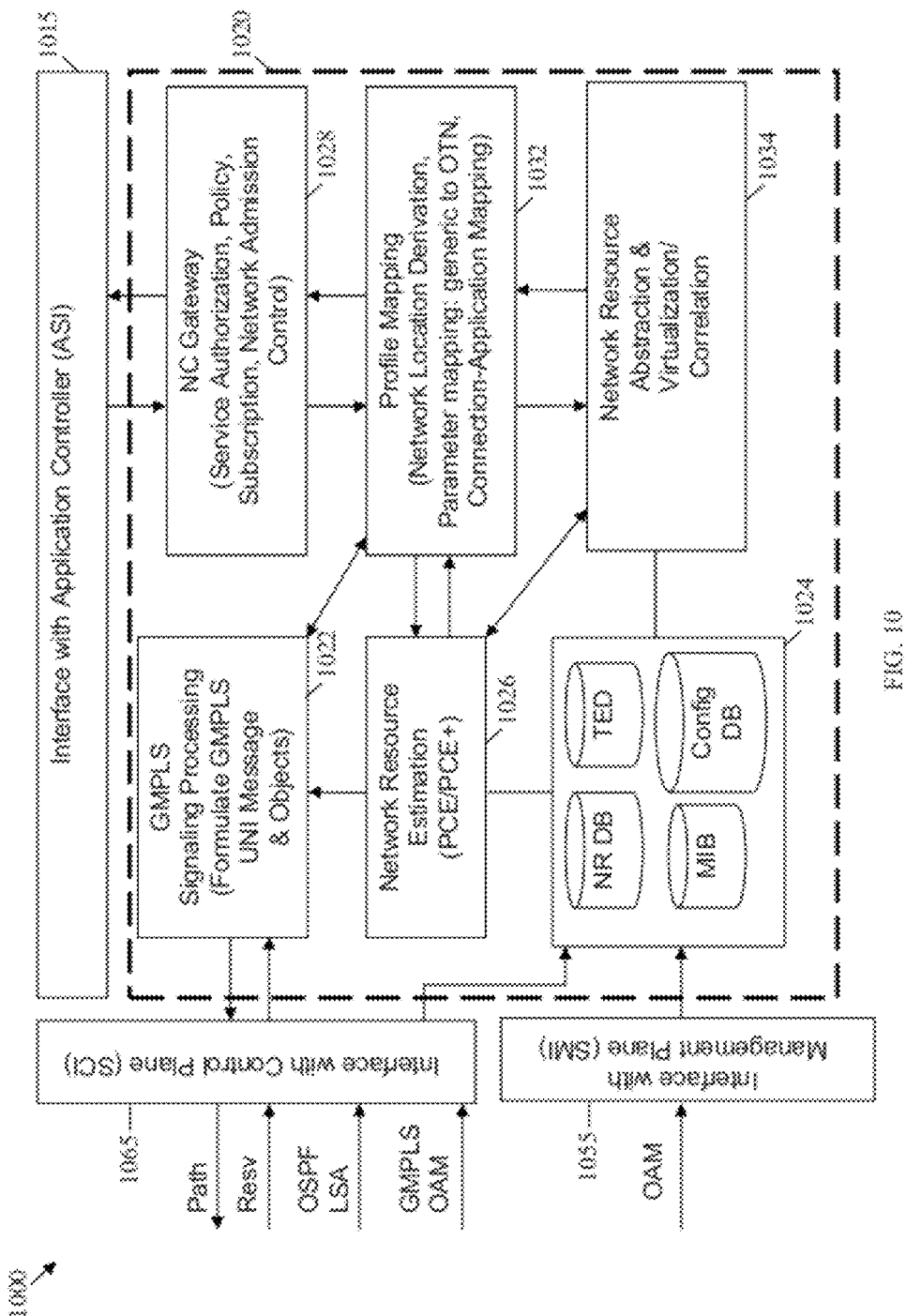
FIG. 10 is a schematic diagram of an embodiment of a service controller architecture.

FIG. 10 illustrates an embodiment of a service controller architecture 1000. The service controller architecture 1000 may comprise a service controller 1020, an ASI 1015, a SCI 1065, and a SMI 1055. The service controller 1020 may be located in a network stratum or underlay, e.g., at a service plane. The service controller 1020 may comprise a plurality of modules, engines, or entities, including a Generalized MPLS (GMPLS) signaling processing engine 1022, a plurality of network service databases 1024, a network resource estimation engine 1026, a network CSO gateway (NCG) 1028, a profile mapping engine 1032, and a network resource abstraction and virtualization/correlation engine 1034, which may communicate with one another. The NCG 1028 in the service controller 1020 may correspond to the NCG.

The GMPLS signaling processing engine 1022 may formulate user network interface (UNI) messages and objects and communicate with the control plane via the SCI 1065, such as to send path information, receive reservation requests, receive open shortest path first (OSPF) link state advertisements (LSAs), receive GMPLS operation, administration, and maintenance (OAM) messages, and/or exchange other path related information. The network resource estimation engine 1026 may correspond to or comprise a PCE or a PCE plus (PCE+) entity. The NCG 1028 may handle service authorization, policy, subscription, network admission control, and other functions as described above. The profile mapping engine 1032 may handle network location derivation, parameter mapping, e.g., generic to OTN, and connection-application mapping. The other components of the service controller architecture 1000 may be configured similar to the corresponding components described above.

Figure 11:
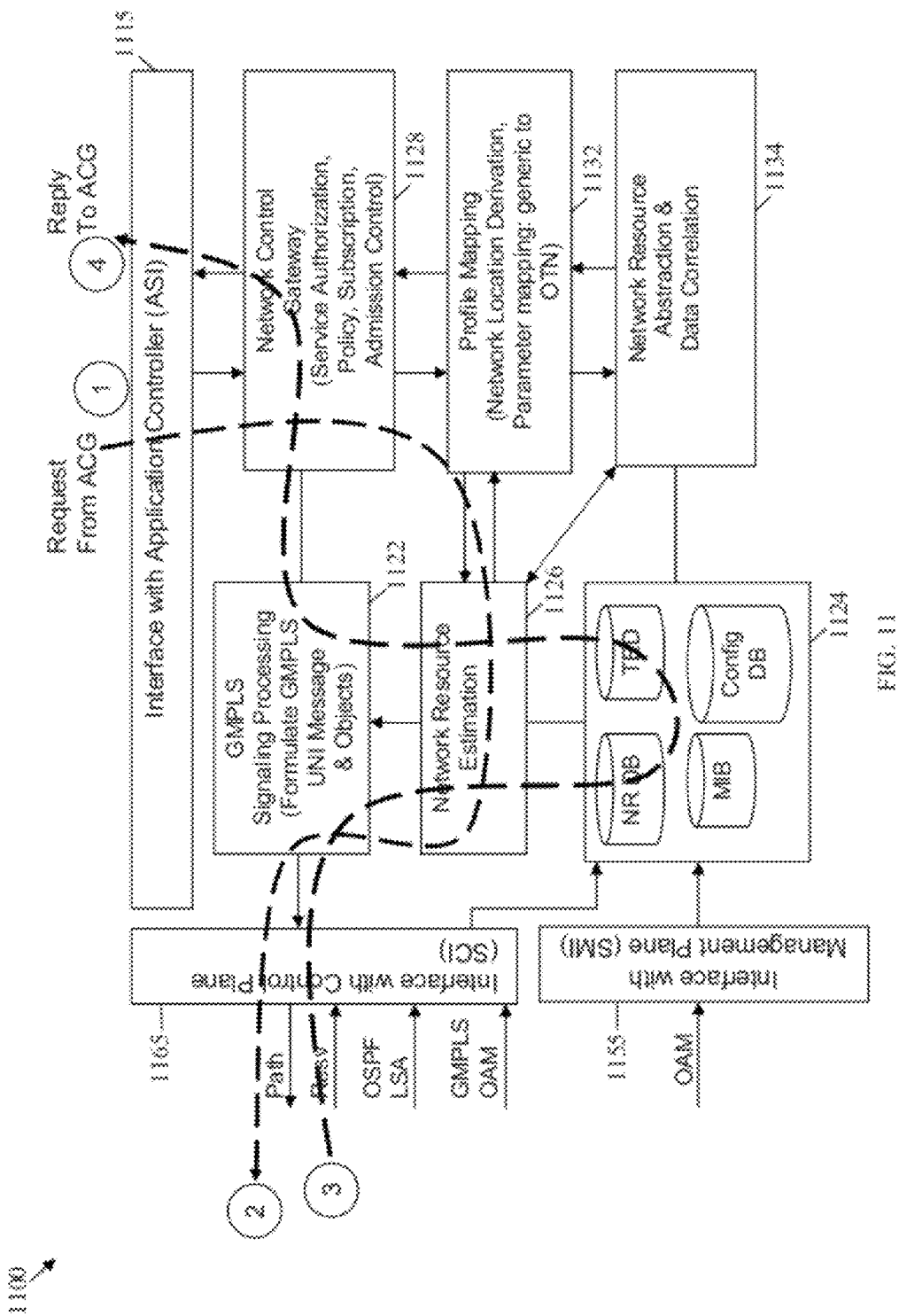
FIG. 11 is a schematic diagram of an embodiment of a resource reservation.

FIG. 11 illustrates an embodiment of a resource reservation 1100 that may be implemented based on the network controller architecture 1000 (in a network stratum or underlay) using the service plane. The resource reservation 1100 may be sent from the application stratum to the network stratum to reserve network resources for a user application or service. The resource reservation 1100 may be initiated at step 1 where an ACG may send a request for resource reservation, e.g., for establishing connectivity or a path to enable an application or service, to the service plane. The request may be sent to a NCG 1128 (in the network controller of the service plane) via an ASI 1115. The NCG 1128 may forward the request to a network resource estimation engine 1126 that may compute a resource, e.g., a path, and forward the request and/or the computed resource to a network plane via a SCI 1165. The request may then be forwarded to a GMPLS signaling processing engine 1122, which may in turn process the request and signal the response accordingly via the SCI to a control plane. At step 2, the control plane may handle the request, for instance by reserving the resources for the computed path. At step 3, the control plane may forward a response via the SCI 1165 to the network service databases 1124, which may be used to implement resource reservation according to network information in the databases. The response may then be forwarded to the GMPLS signaling processing engine 1122, which may in turn process the response and signal the response accordingly to the NCG 1128. At step 4, the NCG 1128 may then return the response to the ACG via the ASI 1115. Profile mapping engine 1132, network resource abstraction and data correlation engine 1134, and SMI 1155 may be configured and operate substantially similarly to profile mapping engine 1032, network resource abstraction and virtualization/correlation engine 1034, and SMI 1055. The components above may be configured substantially similar to the corresponding components of the network controller architecture 1000.

Figure 12:
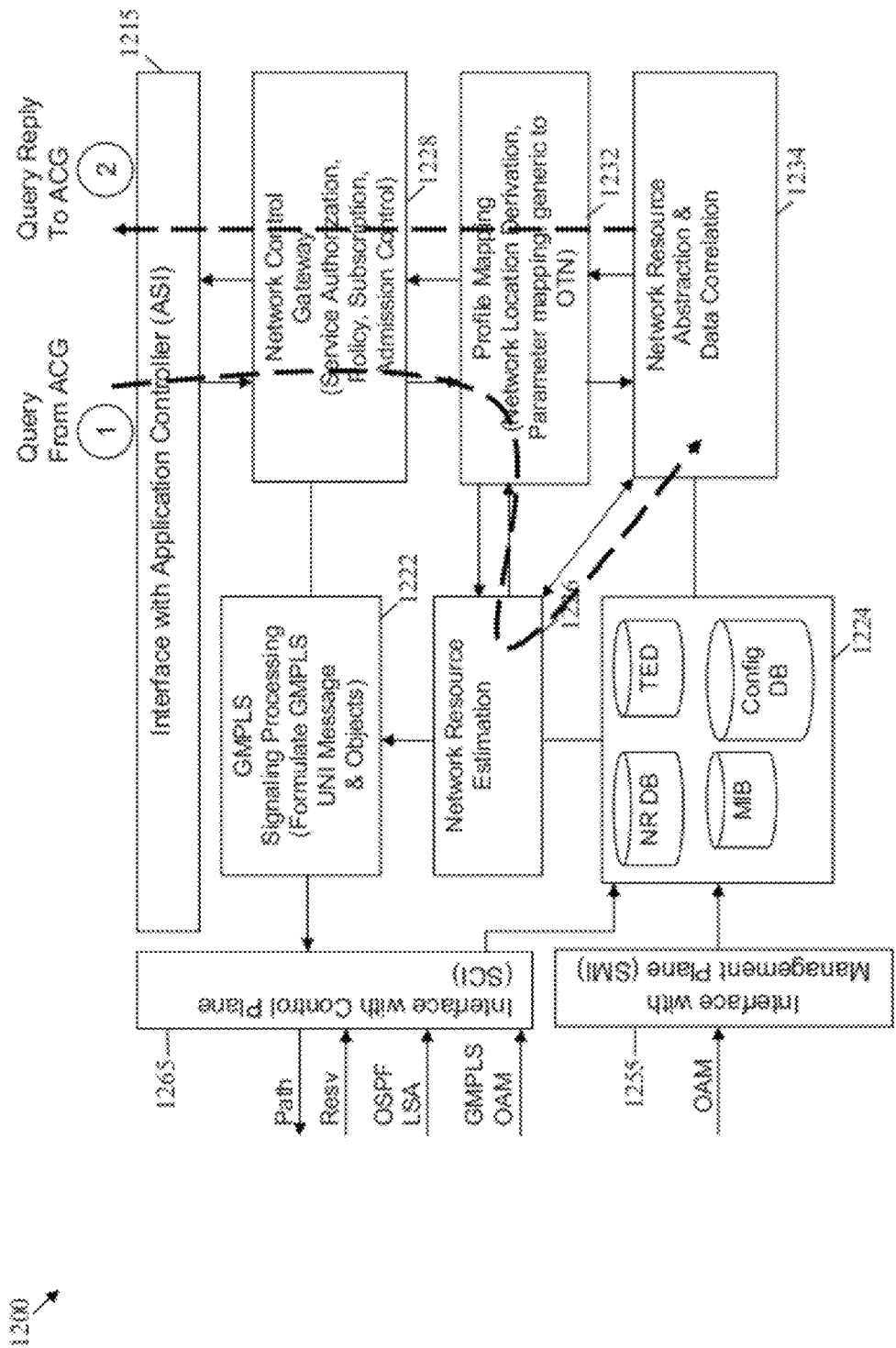
FIG. 12 is a schematic diagram of an embodiment of a resource query.

FIG. 12 illustrates an embodiment of a resource query 1200 that may also be implemented based on the network controller architecture 1000 (in a network stratum or underlay) using the service plane. The resource query 1200 may be sent from the application stratum to the network stratum to query whether network resources for a user application or service may be granted. The resource query 1200 may be initiated at step 1 where an ACG may send a query for resource reservation, e.g., a query about whether to establish connectivity or a path to enable an application or service, to the service plane. The query may be sent to a NCG 1228 (in the network controller of the service plane) via an ASI 1215. The NCG 1228 may forward the query to a profile mapping engine 1232 that may map the information in the query to the corresponding network technology parameters. The query may then be sent to a network resource estimation engine 1226 that may determine whether a path or resources may be computed, and forward the query to a network resource abstraction and data correlation engine 1234. At step 2, the network resource abstraction and data correlation 1234 may determine the resources available to serve the resource query and return a response to the profile mapping engine 1232, which may translate the information in the response and subsequently forward the response to the NCG 1228. The NCG 1228 may return the response to the ACG via the ASI 1215. The components above may be configured substantially similar to the corresponding components of the network controller architecture 1000.

Figure 13:
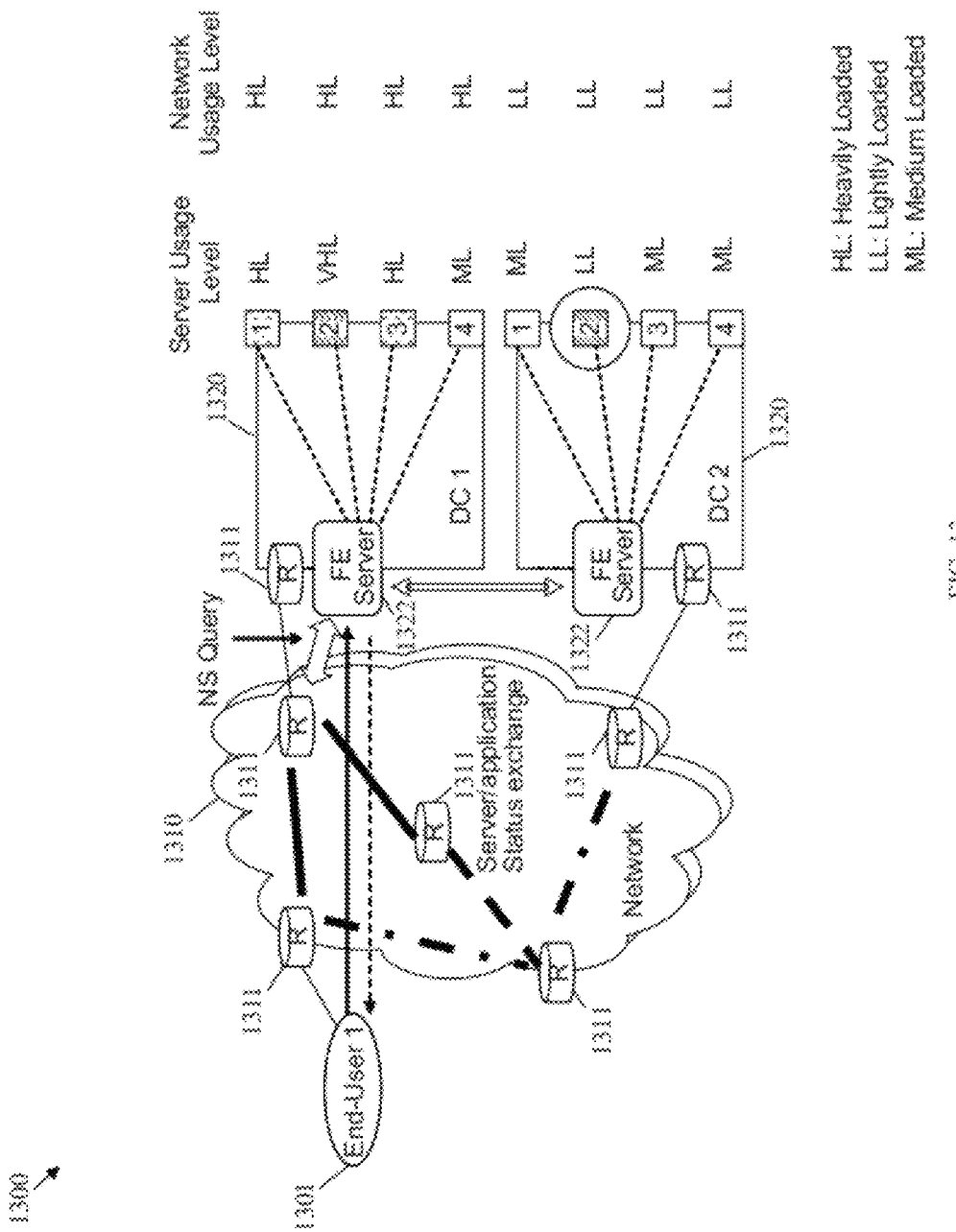
FIG. 13 is a schematic diagram of an embodiment of a network-aware global load balancing.

FIG. 13 illustrates an embodiment of a network-aware global load balancing 1300 that may be implemented according the CSO architectures described above. Initially, an end-user 1301 may access a network 1310 and send a network service (NS) query to a front-end (FE) server 1322, e.g., at an application stratum, in a first data center 1320 (DC1). The network 1310 may comprise a plurality of components and resources, such as a plurality of nodes or routers 1311 for forwarding data and services. The NS query may be sent to request accessing a server and/or a path in the network 1310 to enable an application or provide a service for the end-user 1301. The FE server 1322 may maintain or access information about the server usage level and network usage level of different links and/or nodes in the network 1310. The server usage level may determine the loads on the different servers in the same data center 1320 and the network usage level may determine the network resource usage (e.g., bandwidth usage) of the different paths and routers 1311 that connect to the servers. For example, the server and similarly network usage levels may range from heavily loaded (HL), medium loaded (ML), and lightly loaded (LL).

Upon receiving the NS request, the FE server 1322 may compare the different server usage and network usage levels in the same data center 1320, such as for four different servers 1, 2, 3, and 4. The FE server 1322 may also communicate with a second FE server 1322 in a second DC 1320 (DC2) to compare the server and network usage levels in DC2 with DC1. The FE servers 1322 may then determine the paths and routers that may be optimized to provide the application or service to the end-user 1301. The selected paths and routers 1311 may be a compromise between a SS algorithm that guarantees a server comprising the requested content and a path computation (PC) algorithm that guarantees improving network utilization (in term of resources or bandwidth). The steps and communications for the network-aware global load balancing 1300 may be implemented using the CSO architecture. For instance, communications between the DCs 1320 at the application stratum and the network stratum may be achieved using the resource query 1200 and/or the resource reservation 1100 and their associated network entities and engines.

Figure 14:
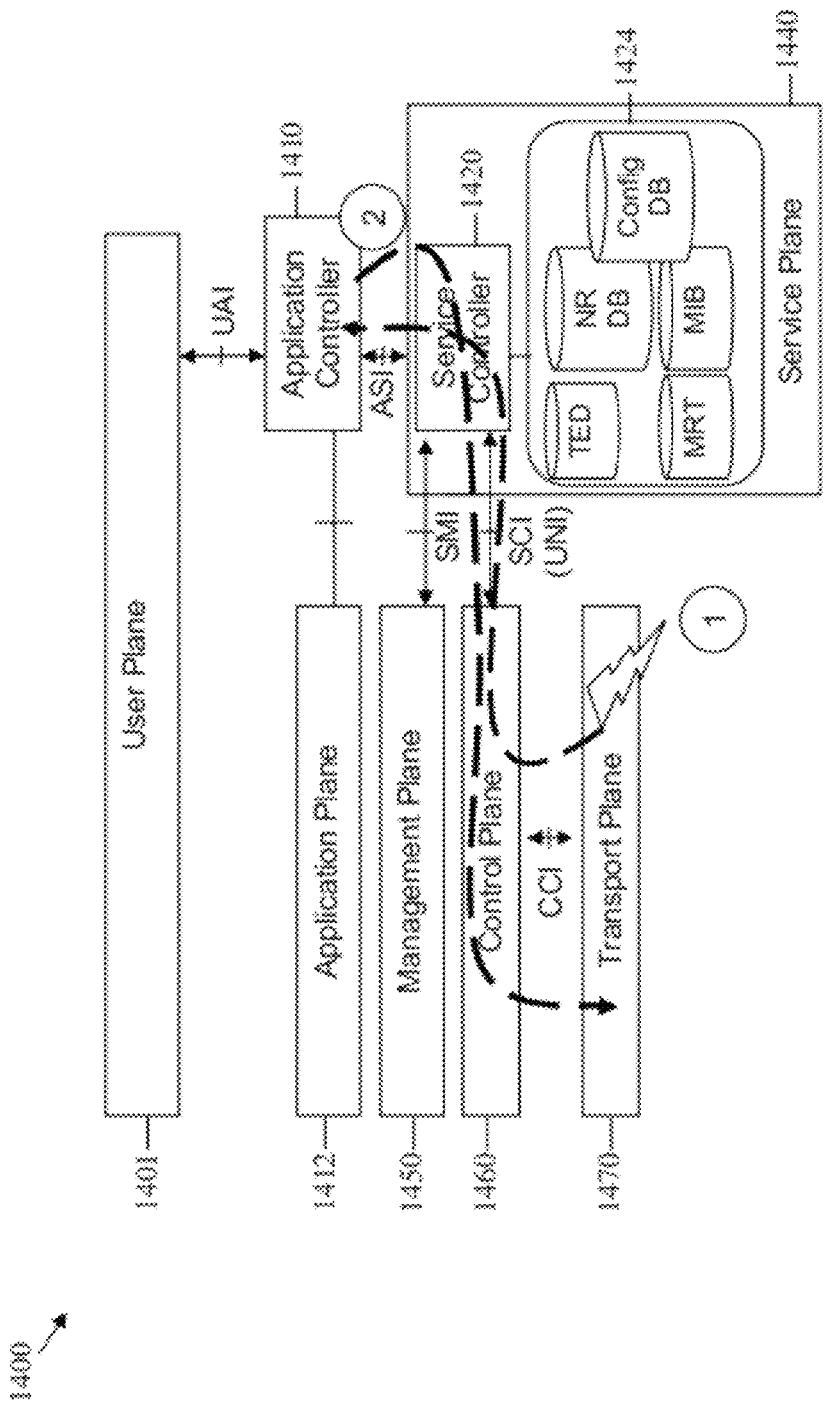
FIG. 14 is a schematic diagram of an embodiment of a network event escalation.

FIG. 14 illustrates an embodiment of a network event escalation 1400 that may be implemented based on the CSO architecture. The network event escalation 1400 may be implemented between the application stratum and the network stratum to handle a network event. The network event may be a network failure, congestion, an event triggered by a network condition, or any other event that may occur at the network stratum and may affect the application stratum or overall network operation, and thus affect user applications and services. When a network event occurs, the network applies protection/restoration schemes associated with the application connection. When network level protection/restoration does not work, the network may escalate to the service plane which in turn escalates to the application for a possible change of the resource origin. The application may provide an alternative server location to the service plane. The service plane may interact with the control plane to find the path that can provide the application to the user.

For instance, at step 1, a network event or failure may occur at a transport plane 1470. The event may be escalated by informing a control plane 1460, and subsequently a service controller 1420 in a service plane 1440. The service controller 1420 may then escalate the event to an application controller 1410 in communications with an application plane 1412. The application plane 1412 may then respond to the event and/or inform the user plane 1401. As such, at step 2, the application controller 1410 may send a new request to the service controller 1420. The request may then be forwarded to the control plane 1460 and then to the transport plane 1470, where the request may be processed to handle the network event. The components above may be configured substantially similar to the corresponding components of the network controller architecture 800.

Figure 15:
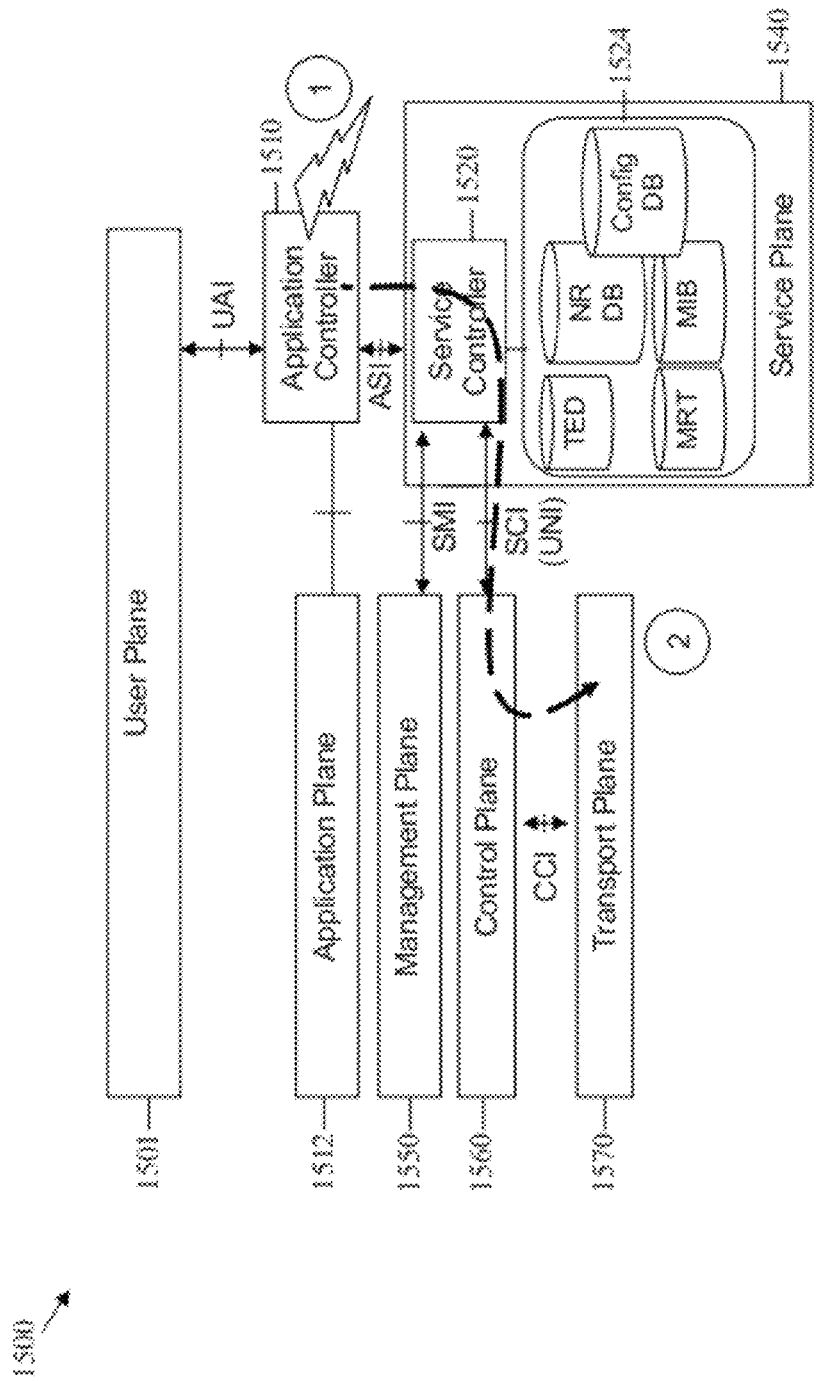
FIG. 15 is a schematic diagram of an embodiment of an application event escalation.

FIG. 15 illustrates an embodiment of an application event escalation 1500 that may be implemented based on the CSO architecture. The application event escalation 1500 may be implemented between the application stratum and the network stratum to handle an application event. When an application level event occurs (e.g., server failure, etc.), the ACG may attempt to find alternative servers in the same host location. If alternative servers are only available in the remote locations, then the ACG may provide such information to the NCG for possible connectivity change for the existing connection.

For instance, at step 1, an application event or failure may occur at an application plane 1512. Thus, an application controller 1510 in communications with the application plane 1512, where the event occurred, may escalate the event by informing a service controller 1520 in a service plane 1540. In turn, the service controller 1520 may escalate the event to a control plane 1560. At step 2, the control plane 1560 may inform a transport plane 1570 of the application event. The network planes may then handle the event, such as by establishing new paths and/or allocating new resources for the application plane 1512. The components above may be configured substantially similar to the corresponding components of the network controller architecture 800.

Figure 16:
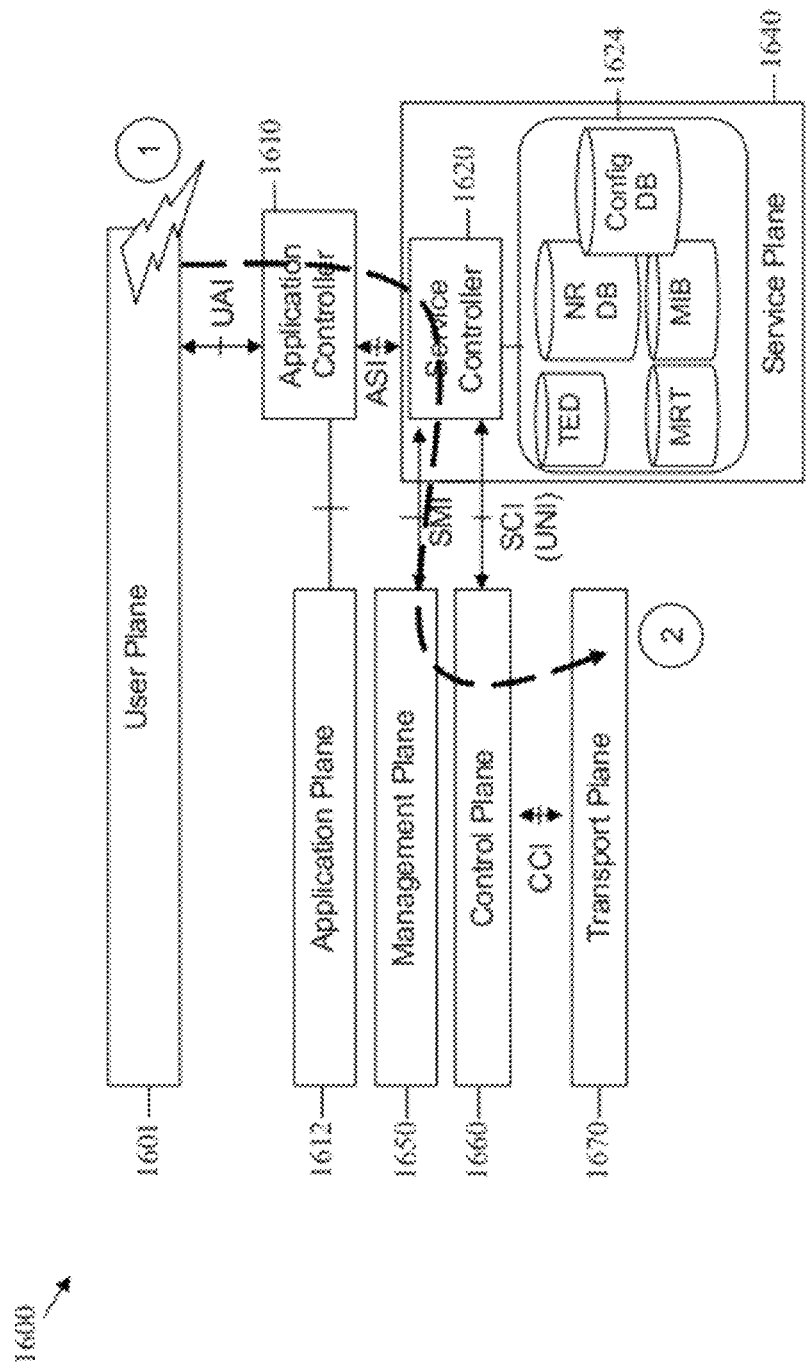
FIG. 16 is a schematic diagram of an embodiment of a Quality of Service (QoS) degradation escalation.

FIG. 16 illustrates an embodiment of QoS degradation escalation 1600 that may be implemented based on the CSO architecture. The QoS degradation escalation 1600 may be implemented between the application stratum and the network stratum to handle a QoS degradation, which may be triggered by a network event, as described above. When the user experiences degradation of QoS for an application, the user may signal this event to the ACG. If this degradation is due to server issues, then the ACG may attempt to find alternative servers in the same host location and switch over to the alternative server to mitigate the degradation. If the degradation is not related to a server or if alternative servers are only available in the remote locations, then the ACG may provide such information to the NCG for possible connectivity change for the existing connection.

For instance, at step 1, a QoS degradation may occur at a user plane 1601. Thus, an application controller 1610 in communications with the user plane 1601 may escalated the detected QoS degradation by informing a service controller 1620 in a service plane 1640. In turn, the service controller 1620 may escalate the QoS degradation to a control plane 1660. At step 2, the control plane 1660 may inform a transport plane 1670 of the QoS degradation. The network planes may then handle QoS degradation, such as by establishing new paths and/or allocating new resources for the application plane 1612. The components above may be configured substantially similar to the corresponding components of the network controller architecture 800.

Figure 17:
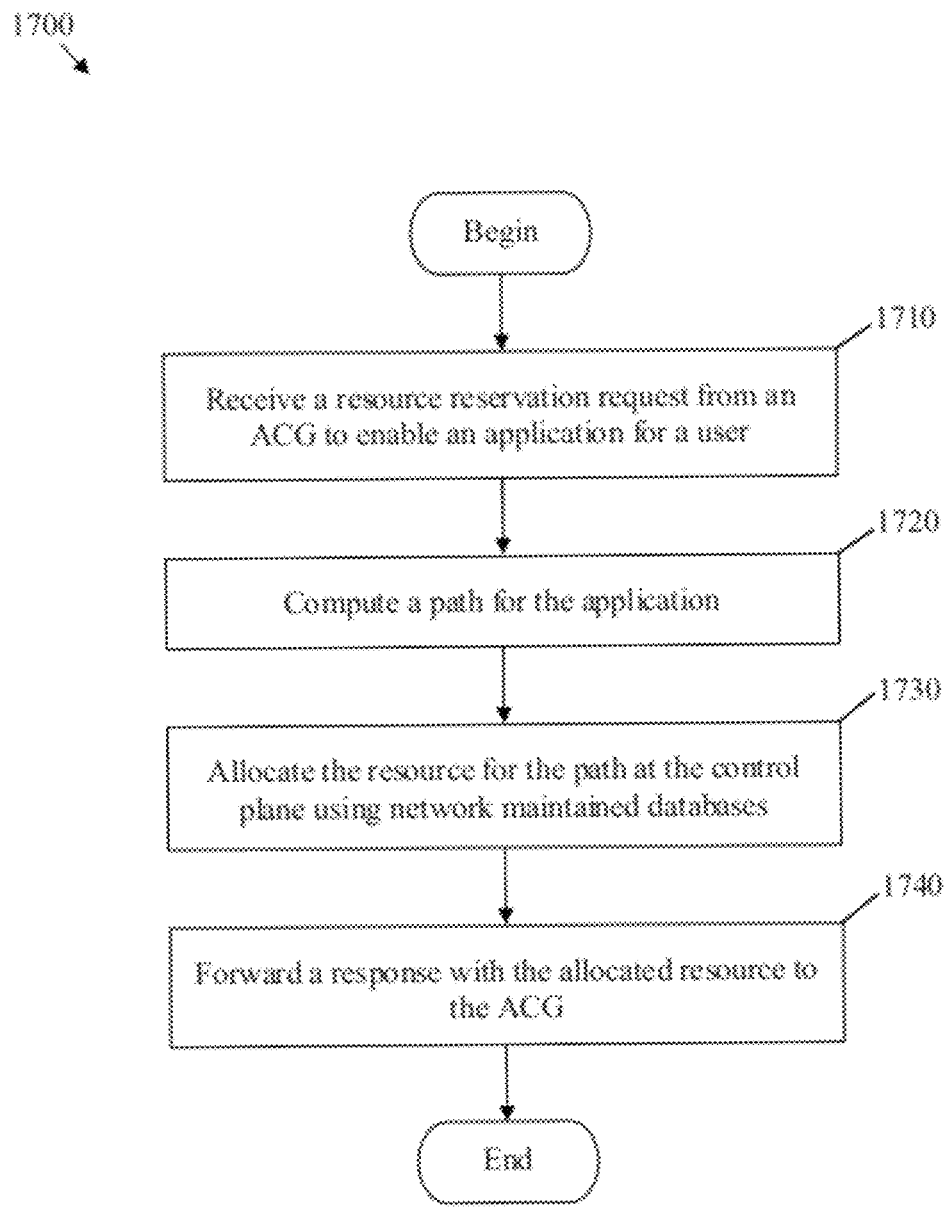
FIG. 17 is a flowchart of an embodiment of a CSO method.

FIG. 17 illustrates an embodiment of a CSO method 1700 that may be implemented by a service plane, a service controller (e.g. service controller 1020), and/or a NCG (e.g., NCG 1028). The method 1700 may begin at block 1710, where a resource reservation request may be received from an ACG to enable an application for a user. For instance, the service controller 1020 or the NCG 1028 may receive from the ACG the resource reservation request via an ASI between an application plane and a service plane (or an application stratum and a network stratum). At block 1720, a path for the application may be computed. For instance, the NCG 1028 may signal the resource reservation request, via the GMPLS signaling and processing engine 1122, to the network resource estimation engine 1126 (e.g., a PCE) to calculate the path. At block 1730, the resource may be allocated for the path at the control plane using network maintained databases. For instance, the computed path may be sent to the control plane via the SCI to reserve the allocated resource based on information in the network service databases 1124. At block 1740, a response may be forwarded with the allocated resource to the ACG. For instance, the allocated resource may be signaled via the GMPLS signaling and processing engine 1122 to the NCG 1128, which may then forward the response to the ACG. The ACG may communicate this information with the application plane to establish the path and resource for the user's application. The method 1700 may then end.

Figure 18:
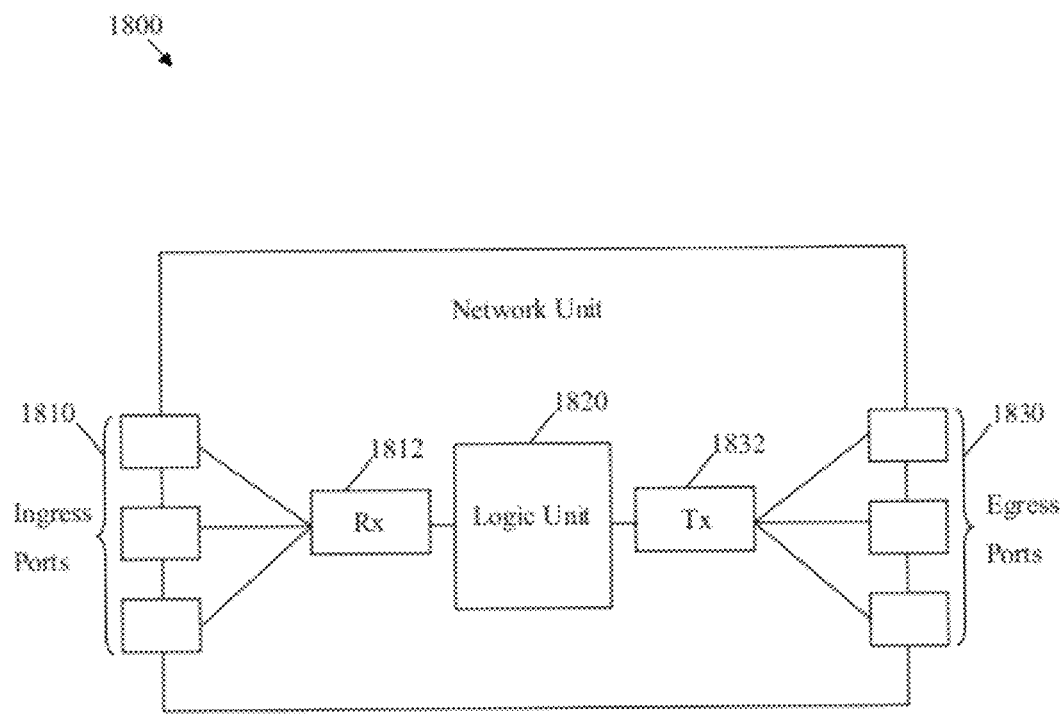
FIG. 18 is a schematic diagram of an embodiment of a network unit.

FIG. 18 illustrates an embodiment of a network unit 1800, which may be any device that transports and processes data through the network. The network unit 1800 may comprise one or more ingress ports or units 1810 coupled to a receiver (Rx) 1812 for receiving signals and frames/data from other network components. The network unit 1800 may comprise a logic unit 1820 to determine which network components to send data to. The logic unit 1820 may be implemented using hardware, software, or both. The network unit 1800 may also comprise one or more egress ports or units 1830 coupled to a transmitter (Tx) 1832 for transmitting signals and frames/data to the other network components. The receiver 1812, logic unit 1820, and transmitter 1832 may also implement or support the resource reservation 1100, the resource query 1200, the network-aware global load balancing 1300, the network event escalation 1400, the application event escalation 1500, the QoS degradation escalation 1600, and/or the CSO method 1700. The components of the network unit 1800 may be arranged as shown in FIG. 18.

Figure 19:
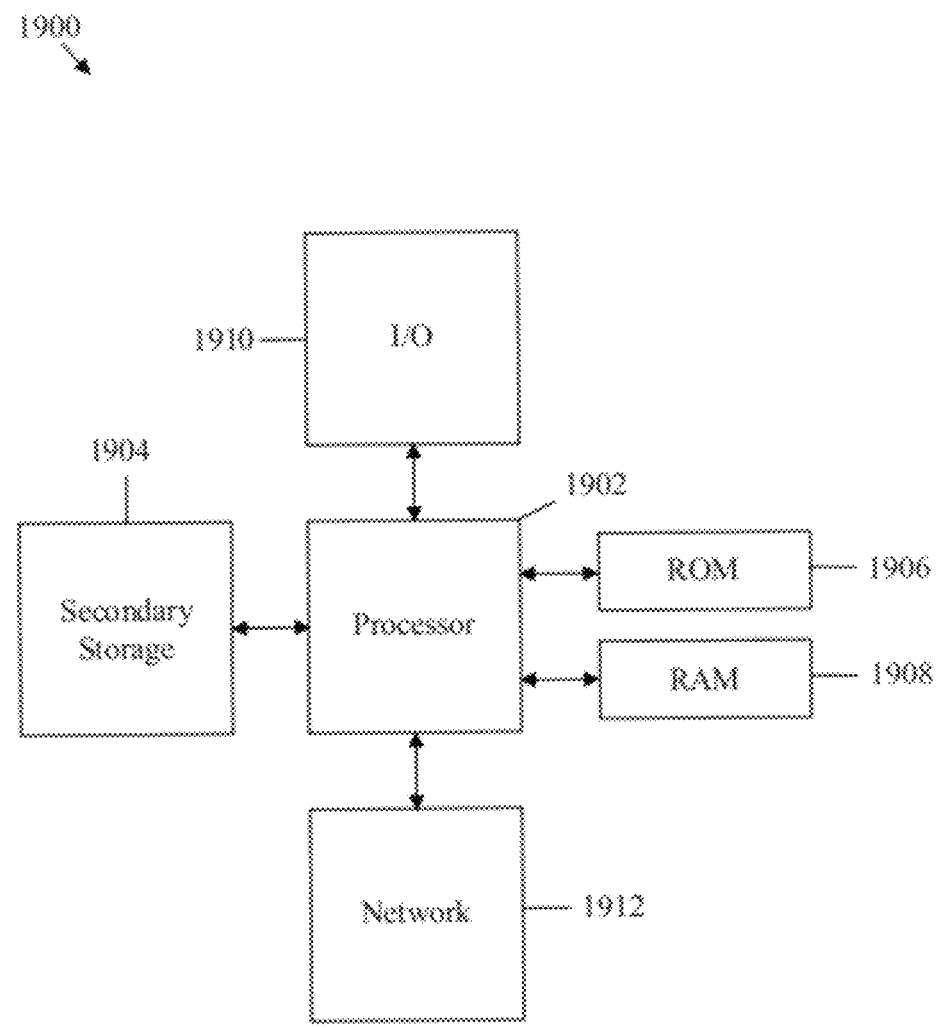
FIG. 19 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 19 illustrates a typical, general-purpose network component 1900 suitable for implementing one or more embodiments of the components disclosed herein. The network component 1900 includes a processor 1902 (which may be referred to as a central processor unit or CPU) that is in communication with memory devices including secondary storage 1904, read only memory (ROM) 1906, RAM 1908, input/output (I/O) devices 1910, and network connectivity devices 1912. The processor 1902 may be implemented as one or more CPU chips, or may be part of one or more application specific integrated circuits (ASICs).

The secondary storage 1904 is typically comprised of one or more disk drives or tape drives and is used for non-volatile storage of data and as an over-flow data storage device if RAM 1908 is not large enough to hold all working data. Secondary storage 1904 may be used to store programs that are loaded into RAM 1908 when such programs are selected for execution. The ROM 1906 is used to store instructions and perhaps data that are read during program execution. ROM 1906 is a non-volatile memory device that typically has a small memory capacity relative to the larger memory capacity of secondary storage 1904. The RAM 1908 is used to store volatile data and perhaps to store instructions. Access to both ROM 1906 and RAM 1908 is typically faster than to second storage 1904.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   an application cross-stratum optimization (CSO) gateway (ACG) configured to:
      communicate with a plurality of servers at an application layer to obtain application resource information; and
      request virtual network topology information from a network layer via a network CSO gateway (NCG); and
   the NCG coupled to the ACG via an application-network interface (ANI) and configured to communicate with a plurality of network nodes at a plurality of network layers below the application layer to obtain the virtual network topology information,
   wherein the ANI supports transmission of virtual network topology information to the ACG for optimized server selection based on the application resource information and the virtual network topology information.

2. The apparatus of claim 1, wherein the ANI allows network stratum related query and event escalation from the application layer from an application stratum related query and event escalation from a network stratum.

3. The apparatus of claim 1, wherein the ANI enables an application-aware network stratum and a network-aware application stratum.

4. The apparatus of claim 1, wherein the ACG is aware of application processes and application related data in an application stratum, and wherein the NCG is aware of network processes and network related data in a network stratum.

5. The apparatus of claim 1, wherein the NCG is coupled to a path computation element (PCE) in a network stratum.

6. The apparatus of claim 1, wherein the ACG is configured to communicate with a plurality of NCGs that correspond to a plurality of domains in a network stratum via a plurality of corresponding ANIs.

7. The apparatus of claim 6, wherein the NCGs are coupled to a plurality of corresponding path computation elements (PCEs) in the corresponding domains.

8. The apparatus of claim 6, where the domains comprise at least one of access, backbone, and aggregation network that are based on the same or different technology and that correspond to the same or different network layers.

9. The apparatus of claim 1, wherein the NCG is configured to operate over a plurality of Autonomous systems that correspond to a same Routing Administrative Domain (AD).

10. The apparatus of claim 1, wherein the servers are distributed in a plurality of data centers and configured to receive network service (NS) queries from one or more end-users at the application layer, and wherein the NS queries are processed at the network layers to compare different server usage and network usage levels at the data centers to select the servers and network nodes for servicing the NS queries and achieving network load balancing.

11. The apparatus of claim 1, wherein the ANI further supports transmission of resource reservation requests to the NCG for path computation in the network layer and reservation of a computed path to a selected server.

* * * * *